US010826067B2

(12) United States Patent
Kuo et al.

(10) Patent No.: US 10,826,067 B2
(45) Date of Patent: Nov. 3, 2020

(54) ENERGY STORAGE DEVICE

(71) Applicant: NATIONAL CHENG KUNG UNIVERSITY, Tainan (TW)

(72) Inventors: Ping-Lin Kuo, Tainan (TW); Chih-Hao Tsao, New Taipei (TW); Kuan-Ting Lee, New Taipei (TW); Chien-Ju Wu, Tainan (TW); Chen-Yu Wang, Kaohsiung (TW); Chang-Yu Hsu, Tainan (TW)

(73) Assignee: POLYBATT MATERIALS CO., LTD., Kaohsiung (TW)

( * ) Notice: Subject to any disclaimer, the term of this patent is extended or adjusted under 35 U.S.C. 154(b) by 126 days.

(21) Appl. No.: 15/992,278

(22) Filed: May 30, 2018

(65) Prior Publication Data

US 2018/0351179 A1 Dec. 6, 2018

(30) Foreign Application Priority Data

Jun. 1, 2017 (TW) .............................. 106118039 A

(51) Int. Cl.
*H01M 4/62* (2006.01)
*H01M 4/58* (2010.01)
*H01M 10/0565* (2010.01)
*H01M 10/052* (2010.01)

(52) U.S. Cl.
CPC ............. *H01M 4/623* (2013.01); *H01M 4/58* (2013.01); *H01M 10/052* (2013.01); *H01M 10/0565* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS 8,993,157 B2 * 3/2015 Yang ..................... H01M 4/623
429/200

* cited by examiner

*Primary Examiner* — Wyatt P McConnell
(74) *Attorney, Agent, or Firm* — Schmeiser, Olsen & Watts, LLP

(57) ABSTRACT

An energy storage device has an anode, a cathode and an electrolyte membrane, installed in between the anode and the cathode, wherein at least one of the anode, the cathode and the electrolyte membrane is incorporated with a copolymer and the copolymer is grafted to a functional group with ionic conductive function. Therefore, the energy storage device, which utilizes copolymers and electrolyte membranes, has better efficiency of charge/discharge performance; thus the efficiency thereof increases; the lifetime thereof is prolonged effectively.

9 Claims, 13 Drawing Sheets

ENERGY STORAGE DEVICE

CROSS-REFERENCE TO RELATED APPLICATION

This non-provisional application claims priority under 35 U.S.C. § 119(a) on Patent Application No(s). 106118039 filed in Taiwan, R.O.C. on Jun. 1, 2017, the entire contents of which are hereby incorporated by reference.

FIELD OF THE INVENTION

The present invention relates to an energy storage device, and, more specifically, to an energy storage device that has at least one of the anode, the cathode and the electrolyte membrane being incorporated with a copolymer wherein the copolymer has been synthesized by grafting to a functional group with ionic conductive function.

BACKGROUND OF THE INVENTION

Energy storage devices have been widely applied to all kinds of electronic products. The physical and chemical properties of the copolymer adopted in the energy storage device have a specific level of impact on the efficiency of charge/discharge performance of the energy storage device. Therefore, how to alter the chemical structure of the copolymer in order to improve the efficiency of charge/discharge performance of the energy storage device becomes the goal for individuals skilled in the art to which the present invention pertains.

The U.S. patent U.S. Pat. No. 8,993,157 B2 discloses a type of electrochemical cell wherein the (PVDF-g-PAN) copolymer used in the anode of the electrochemical cell is synthesized by grafting polyacrylonitrile onto the main chain composed of polyvinylidene difluoride (PVDF).

SUMMARY OF THE INVENTION

The efficiency of charge/discharge performance of an energy storage device of the prior art that uses copolymers still leaves room for improvement. Therefore, one of the objectives of the present invention is to provide a type of energy storage device using innovative copolymers that have higher efficiency of charge/discharge performance.

In order to achieve the aforementioned objective and other objectives, the present invention provides a type of energy storage device, comprising:
an anode and a cathode; and
an electrolyte membrane, installed in between the anode and the cathode,
wherein at least one of the anode, the cathode and the electrolyte membrane comprising a copolymer which is derived from polyvinylidene difluoride (PVDF), and the copolymer is grafted with a functional group with the ionic conductive function,
wherein the functional group with the ionic conductive function has a chemical structure selected from the group consisting of quaternary ammonium, phosphoniumgroup, sulfonato, cyano and polyether.

In order to achieve the aforementioned objective and other objectives, the present invention provides a type of energy storage device, comprising:
an anode and a cathode; and
an electrolyte membrane, installed in between the anode and the cathode,
wherein at least one of the anode, the cathode and the electrolyte membrane is incorporated with a copolymer having the structural formula described in formula (I) or formula (II);

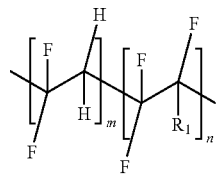

Formula (I)

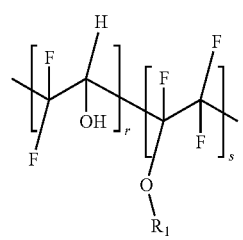

Formula (II)

wherein $R_1$ is a copolymer having one of the following structures, for example, comprising a copolymer of styrene monomers or methyl methacrylate monomers (MMA) that contains vinyl monomers or acrylate monomers;

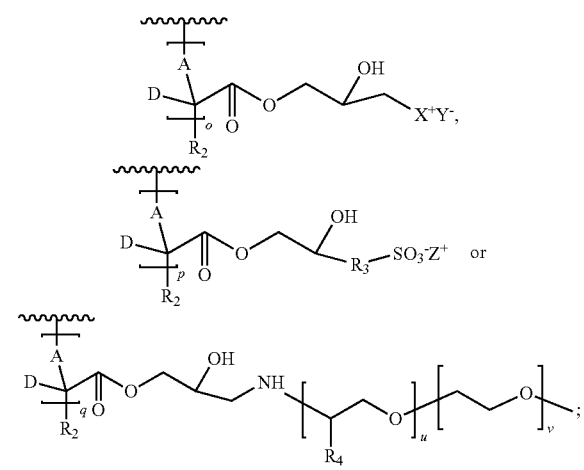

A is a covalent bond or —$CH_2$—;
D is H or —$CH_3$;
$X^+$ is chosen from

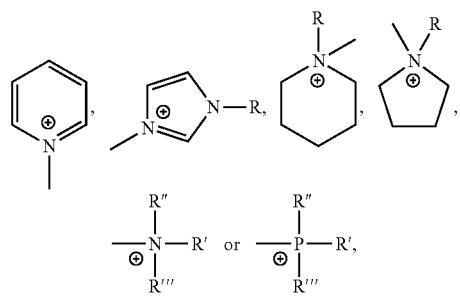

wherein R, R', R", R'" are independently chosen from
—CH$_3$, —CH$_2$CH$_3$, —CH$_2$CH$_2$CH$_3$,
—CH$_2$CH$_2$CH$_2$CH$_3$, —CH$_2$CH$_2$OCH$_3$ or
—CH$_2$CH$_2$O—CH$_2$CH$_2$OCH$_3$CH$_3$;

Y$^-$ is chosen from PF$_6^-$, BF$_4^-$,

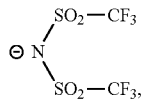

ClO$_4^-$, halide anion, or anions of lithium salt frequently used in the electrolyte;

Z$^+$ is Li$^+$ or H$^+$;

R$_2$ is chosen from H, halogen or

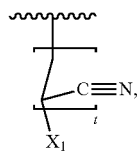

wherein X$_1$ is H, halogen or termination group of polymerization;

R$_3$ is chosen from —CH$_2$— or —CH$_2$NHCH$_2$CH$_2$—;

R$_4$ is chosen from —CH$_3$, —CH$_2$CH$_3$ or H;

m/(m+n) ranges from 0.01~0.99; n/(m+n) ranges from 0.01~0.99; o ranges from 1~1000; p ranges from 1~1000; q ranges from 1~1000; r/(r+s) ranges from 0.1~0.9; s/(r+s) ranges from 0.1~0.9; t ranges from 1~1000; u ranges from 1~100; v ranges from 1~100.

In one embodiment of the present invention, wherein m ranges from 200~35000; n ranges from 200~35000; r ranges from 200~35000; and s ranges from 200~35000 of the copolymer described in formulate (I) or formulate (II).

In one embodiment of the present invention, the energy storage device has an anode, comprising a copolymer that has a structure described in formulate (I) or formulate (II) to act as a binder.

In one embodiment of the present invention, the copolymer content accounts for 0.1~30% of the anode composition by weight.

In one embodiment of the present invention, the energy storage device has a cathode, comprising a copolymer that has a structure described in formulate (I) or formulate (II) to act as a binder.

In one embodiment of the present invention, the copolymer content accounts for 0.1~30% of the cathode composition by weight.

In one embodiment of the present invention, the energy storage device has an electrolyte membrane, comprising a copolymer that has a structure described in formulate (I) or formulate (II).

In one embodiment of the present invention, the copolymer content accounts for 1~90% of the electrolyte membrane composition by weight.

In one embodiment of the present invention, the energy storage device is an electrochemical cell, known as lithium battery.

In one embodiment of the present invention, at least one of the anode, the cathode and the electrolyte membrane of the energy storage device is incorporated with not only the copolymer of the present invention but also other copolymers.

The energy storage device of the present invention has at least one of the anode, the cathode and the electrolyte membrane being incorporated with a copolymer wherein the copolymer is grafted with a functional group with the ionic conductive function. Therefore, the energy storage device, which utilizes copolymers and electrolyte membranes, has better efficiency of charge/discharge performance; thus the efficiency thereof increases; the lifetime thereof is prolonged effectively.

BRIEF DESCRIPTION OF THE DRAWINGS

The structure and technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
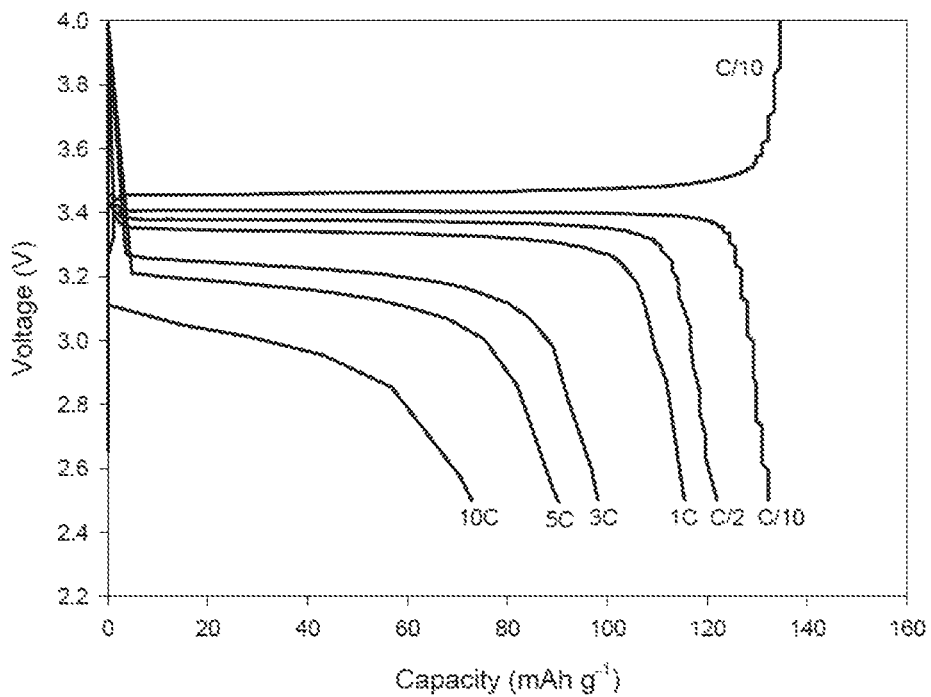
FIG. 1 is a graph of the test results of the embodiment 1-5 of the energy storage device having the copolymer PGG4-0.25EO as a gel electrolyte membrane.

For a better understanding of the objectives, novel features and effects of the present invention, detailed descriptions of the present invention are provided as follows, accompanied by preferred embodiments:

Embodiment 1

The energy storage device of the present invention is incorporated with (P(VDF-co-CTFE)-g-PGMA) copolymer, produced by GMA monomers grafted to (P(VDF-CTFE)), and (PVDF-g-PGMA) copolymer, produced by (PGMA) grafted to (PVDF). The aforementioned copolymers can be prepared using the synthesizing method described in the following embodiments 1-1 to 1-4

Embodiment 1-1: Preparation of P(VDF-co-CTFE)-g-PGMA

One gram (1 g) of (P(VDF-co-CTFE)) is dissolved in 25 ml NMP solvent. After the substance is completely dissolved, add 1 g of GMA and 4,4'-Dimethyl-2,2'-dipyridyl (BPY). After, add CuCl into the reactor to enable atom-transfer radical-polymerization (ATRP). The polymer solution is slowly precipitated after the reaction and the precipitated material is filtered using suction filtration. Remove the white color filamentous solids from the filter paper and place them in an oven to dry for 24 hours. The final output is (P(VDF-co-CTFE)-g-PGMA), that is a P(VDF-CTFE) copolymer grafted with P(GMA). The product is named PGG4.

Embodiment 1-2: Preparation of P(VDF-co-CTFE)-g-PGMA

One gram (1 g) of (P(VDF-co-CTFE)) is dissolved in 25 ml NMP solvent. After the substance is completely dissolved, add 3 g of GMA and 4,4'-Dimethyl-2,2'-dipyridyl (BPY). After, add CuCl into the reactor to enable atom-transfer radical-polymerization (ATRP). The polymer solution is slowly precipitated after the reaction and the precipitated material is filtered using suction filtration. Remove the white color filamentous solids from the filter paper and place them in an oven to dry for 24 hours. The final output is (P(VDF-co-CTFE)-g-PGMA), that is a P(VDF-CTFE) copolymer grafted with P(GMA). The product is named PGG11.

Embodiment 1-3: Preparation of P(VDF-co-CTFE)-g-PGMA

One gram (1 g) of (P(VDF-co-CTFE)) is dissolved in 25 ml NMP solvent. After the substance is completely dissolved, add 5 g of GMA and 4,4'-Dimethyl-2,2'-dipyridyl (BPY) and stir for 30 minutes. After, add CuCl into the reactor to enable atom-transfer radical-polymerization (ATRP). The polymer solution is slowly precipitated after the reaction and the precipitated material is filtered using suction filtration. Remove the white color filamentous solids from the filter paper and place them in an oven to dry for 24 hours. The final output is (P(VDF-co-CTFE)-g-PGMA), that is a P(VDF-CTFE) copolymer grafted with P(GMA). The product is named PGG29.

The reaction process of embodiments 1-1 to 1-3 is described as follows:

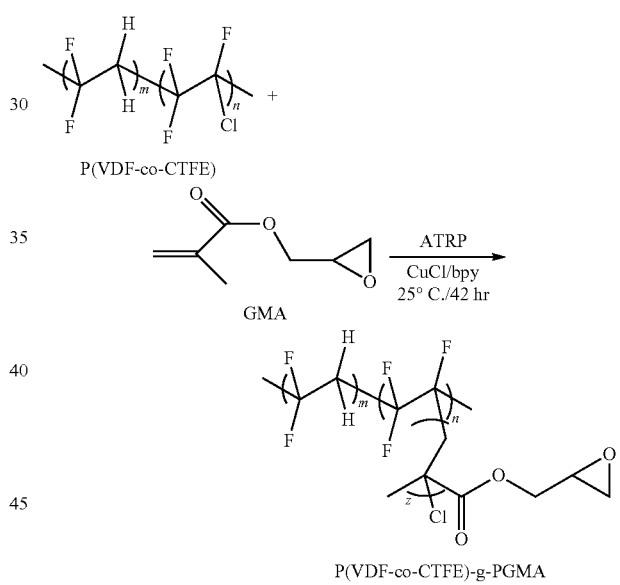

wherein in terms of the amount of the repeating units m ranges from 200~35000; n ranges from 200~35000; z ranges from 1~1000. In terms of the ratio of the repeating units m and n, m/(m+n) ranges from 0.01~0.99; n/(m+n) ranges from 0.01~0.99.

Embodiment 1-4: Preparation of (PVDF-g-PGMA)

Two grams (2 g) of (PVDF) is dissolved in 30 ml NMP solvent. After the substance is completely dissolved, inject an appropriate volume of ozone for 20 minutes. Afterward, add 4 g of GMA and let the reaction take place at 70° C. After the reaction is completed, slowly pour the polymer solution into methanol for precipitation; the precipitated material is then filtered using suction filtration. The final output is (PVDF-g-PGMA), that is a (PVDF) copolymer grafted with (PGMA). The product is named PVDF-g-PGMA.

In the following embodiments 1-5 to 1-11, products of PGG4, PGG11, and PGG29 produced in the embodiments 1-1 to 1-3 respectively further undergo reaction with polyether amines (XTJ-506, purchased from Huntsman Corporation) in order to produce the copolymers used in the energy storage device of the present invention.

Embodiment 1-5: Preparation of Copolymers Containing (PEG-VDF)

Dissolve 0.204 g of polyether amines (PEA, XTJ-506 being used in this case) and 0.296 g of PGG4 in dimethyl sulfoxide (DMSO, 2 grams). Heat the solution to 80° C.; stir the solution for reaction for 5 hours to produce the copolymer used in the energy storage device of the present invention. Afterward, pour the solution to an aluminum tray; place the aluminum tray in a convection oven, heated to 80° C., to dry for 12 hours. A copolymer electrolyte membrane then is produced. The product obtained in the embodiment 1-5 is named PGG4-0.25EO.

Embodiment 1-6: Preparation of (PEG-VDF) Copolymer

Dissolve 0.239 g of PEA (XTJ-506) and 0.261 g of PGG4 in DMSO (2 grams). Heat the solution to 80° C.; stir the solution for reaction for 5 hours to produce the copolymer used in the energy storage device of the present invention. Afterward, pour the solution to an aluminum tray; place the aluminum tray in a convection oven, heated to 80° C., to dry for 12 hours. A (PEG-VDF) copolymer then is produced. The product obtained in the embodiment 1-6 is named PGG4-0.33EO.

Embodiment 1-7: Preparation of (PEG-VDF) Copolymer

Dissolve 0.29 g of PEA (XTJ-506) and 0.21 g of PGG4 in DMSO (2 grams). Heat the solution to 80° C.; stir the solution for reaction for 5 hours to produce the copolymer used in the energy storage device of the present invention. Afterward, pour the solution to an aluminum tray; place the aluminum tray in a convection oven, heated to 80° C., to dry for 12 hours. A (PEG-VDF) copolymer then is produced. The product obtained in the embodiment 1-7 is named PGG4-0.5EO.

Embodiment 1-8: Preparation of (PEG-VDF) Copolymer

Dissolve 0.324 g of PEA (XTJ-506) and 0.176 g of PGG4 in DMSO (2 grams). Heat the solution to 80° C.; stir the solution for reaction for 5 hours to produce the copolymer used in the energy storage device of the present invention. Afterward, pour the copolymer solution to an aluminum tray; place the aluminum tray in a convection oven, heated to 80° C., to dry for 12 hours. A (PEG-VDF) copolymer then is produced. The product obtained in the embodiment 1-8 is named PGG4-0.67EO.

Embodiment 1-9: Preparation of (PEG-VDF) Copolymer

Dissolve 3.79 g of PEA (XTJ-506) and 1.21 g of PGG4 in DMSO (20 grams). Heat the solution to 80° C.; stir the solution for reaction for 5 hours to produce the copolymer used in the energy storage device of the present invention. The product obtained in the embodiment 1-9 is named PGG4-EO.

Embodiment 1-10: Preparation of (PEG-VDF) Copolymer

Dissolve 4.15 g of PEA (XTJ-506) and 0.85 g of PGG11 in DMSO (20 grams). Heat the solution to 80° C.; stir the solution for reaction for 5 hours to produce the copolymer used in the energy storage device of the present invention. The product obtained in the embodiment 1-10 is named PGG11-EO.

Embodiment 1-11: Preparation of (PEG-VDF) Copolymer

Dissolve 4.28 g of PEA (XTJ-506) and 0.72 g of PGG29 in DMSO (20 grams). Heat the solution to 80° C.; stir the solution for reaction for 5 hours to produce the copolymer used in the energy storage device of the present invention. The product obtained in the embodiment 1-11 is named PGG29-EO.

The reaction process of embodiments 1-5 to 1-11 is described as follows:

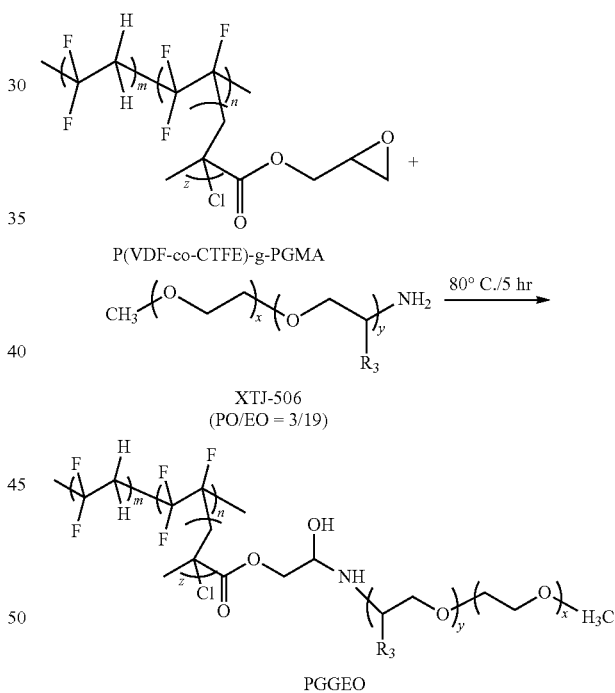

wherein in terms of the amount of the repeating units m ranges from 200~35000; n ranges from 200~35000; x ranges from 1~1000; y ranges from 0~100; z ranges from 1~1000. In terms of the ratio of the repeating units m and n, m/(m+n) ranges from 0.01-0.99; n/(m+n) ranges from 0.01~0.99. $R_3$ is chosen from $CH_3$, $CH_2CH_3$ or H.

Embodiment 1-12: Preparation of Gel Electrolyte Membranes

Use a cutter of 13-mm in diameter to cut the polymer electrolyte membranes produced in embodiments 1-5, 1-6, 1-7, and 1-8 respectively into a circular shape (13 mm in diameter). Place the aforementioned circular membranes in glove boxes filled with argon (Ar) gas and soak the polymer electrolyte membranes individually in the electrolytic solution of Lithium hexafluorophosphate solution in ethylene carbonate and diethyl carbonate (1M LiPF6/EC-DEC (1:1 wt %)) for 24 hours in an environment without water and oxygen to form a plurality of gel electrolyte membranes.

Figure 2:
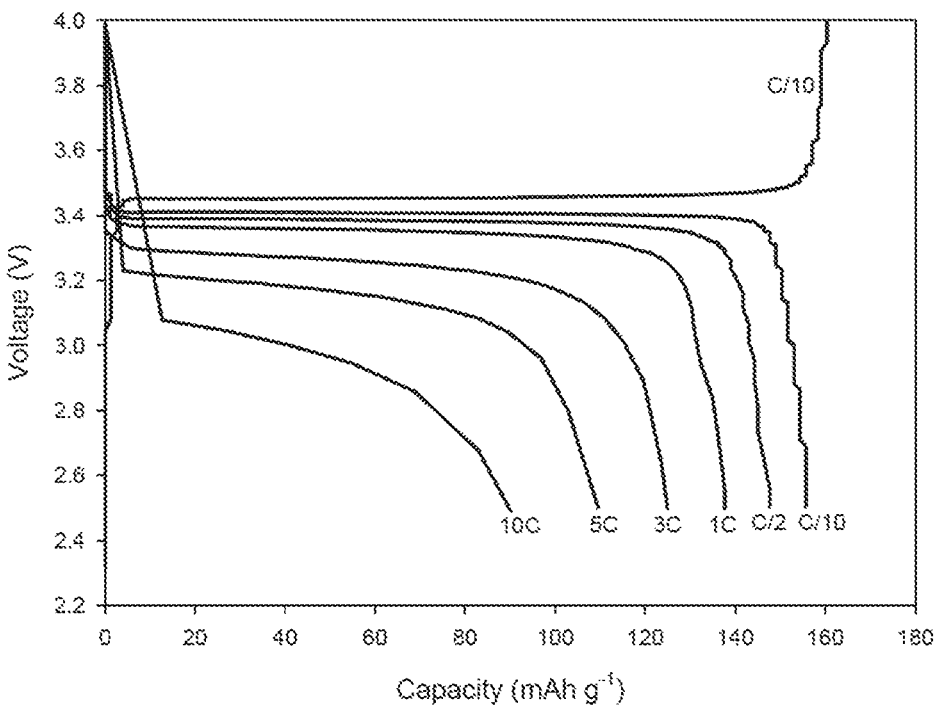
FIG. 2 is a graph of the test results of the embodiment 1-6 of the energy storage device having the copolymer PGG4-0.33EO as a gel electrolyte membrane.
Figure 3:
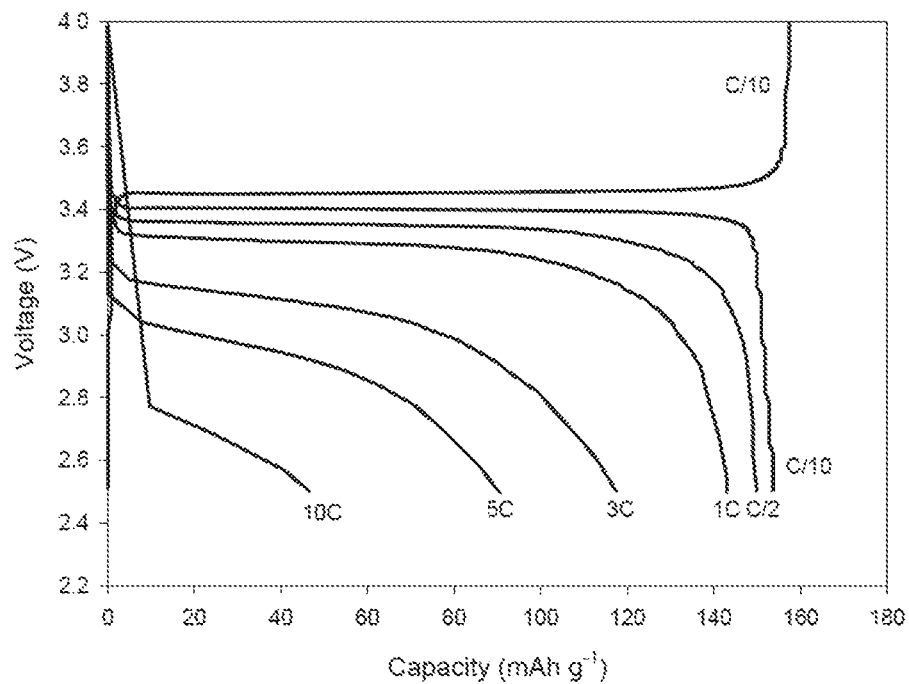
FIG. 3 is a graph of the test results of the embodiment 1-7 of the energy storage device having the copolymer PGG4-0.5EO as a gel electrolyte membrane.
Figure 4:
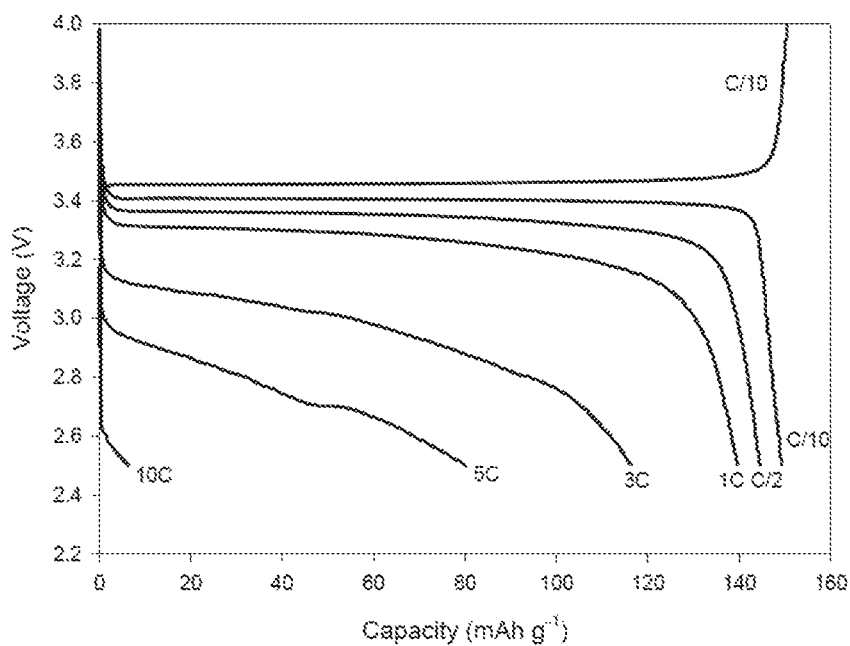
FIG. 4 is a graph of the test results of the embodiment 1-8 of the energy storage device having the copolymer PGG4-0.67EO as a gel electrolyte membrane.

Embodiment 1-13: Test of Charge/Discharge Performance of Gel Electrolyte Membranes The plurality of gel electrolyte membranes produced in embodiment 1-12 are assembled in form of a button cell battery separately. The aforementioned gel electrolyte membranes are placed between the LiFePO$_4$ positive electrode and the lithium metal cathode to form the energy storage device of the present invention, wherein the aforementioned gel electrolyte membrane acts as the separator between the positive electrode and the negative electrode of the energy storage device. Use an 8-channel, low electric current, automatic charge/discharge performance test system (AcuTech Systems, BAT-750B) to measure the efficiency of charge/discharge performance. The electric potential setting ranges between 2.5~4.0V; the charge current setting is 0.1 C; the discharge current setting is set as 0.1 C, 0.5 C, 1 C, 3 C, 5 C, and 10 C. The test results are shown in FIG. 1 to FIG. 4, wherein FIG. 1 is a graph of the test results of the embodiment 1-5 of the energy storage device having the copolymer PGG4-0.25EO as a gel electrolyte membrane; FIG. 2 is a graph of the test results of the embodiment 1-6 of the energy storage device having the copolymer PGG4-0.33EO as a gel electrolyte membrane; FIG. 3 is a graph of the test results of the embodiment 1-7 of the energy storage device having the copolymer PGG4-0.5EO as a gel electrolyte membrane; FIG. 4 is a graph of the test results of the embodiment 1-8 of the energy storage device having the copolymer PGG4-0.67EO as a gel electrolyte membrane. FIG. 1 to FIG. 4 illustrate individually the discharge capacitance of the energy storage device having copolymers produced in embodiments 1-5 to 1-8 respectively at different discharge current densities.

The discharge capacitance values, generated by the aforementioned energy storage device at different current settings, are shown in Table 1, Table 2, Table 3 and Table 4.

TABLE 1

Capacitance of the copolymer in embodiment 1-5 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 132.2 | 122 | 115.4 | 98.1 | 90.3 | 73 |

TABLE 2

Capacitance of the copolymer in embodiment 1-6 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 155.7 | 147.7 | 137.7 | 125 | 109.6 | 90.2 |

TABLE 3

Capacitance of the copolymer in embodiment 1-7 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 153.7 | 150 | 143.1 | 117.6 | 90.7 | 46.8 |

TABLE 4

Capacitance of the copolymer in embodiment 1-8 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 164.1 | 159.1 | 153.6 | 127.9 | 88.4 | 7.2 |

Based on the test results displayed in FIG. 1 to FIG. 4 and Table 1 to Table 4, it is confirmed that the energy storage devices having the copolymer as a gel electrolyte membrane in embodiments 1-5 to 1-8 respectively have excellent efficiency of charge/discharge performance.

Embodiment 1-14: Preparation of Solid Electrolyte Membranes

Dissolve the PGG4-EO produced in embodiment 1-9 in DMSO and then add 30, 50, and 70 percent by weigh of poly(ethylene glycol) dimethyl ether and LiTFSI respectively. After the substances are completely dissolved, pour the solution to an aluminum tray and place the aluminum tray on a heating plate, heated to 80° C., to dry for 20 hours. Copolymers SPE_mPVDF30, SPE_mPVDF50, SPE_mPVDF70 then are produced respectively.

Embodiment 1-15: Preparation of Solid Electrolyte Membranes (Control Group)

Dissolve PVDF in DMSO and then add 70 percent by weigh of poly(ethylene glycol) dimethyl ether and LiTFSI respectively. After the substances are completely dissolved, pour the solution to an aluminum tray and place the aluminum tray on a heating plate, heated to 80° C., to dry for 20 hours. The copolymer SPE_PVDF70 then is produced.

Embodiment 1-16: Tests of the Battery with a Solid Electrolyte Membrane

Use a cutter of 18-mm in diameter to cut the polymer electrolyte membranes produced in embodiments 1-14 into a circular shape (D=18 mm). Place the aforementioned circular membranes in glove boxes filled with argon (Ar) gas and place the solid electrolyte separators between the LiFePO$_4$ positive electrode and the lithium metal negative electrode to assemble in form of a button cell battery.

Embodiment 1-17: Ionic Conductivity of a Solid Electrolyte Membrane

Figure 5:
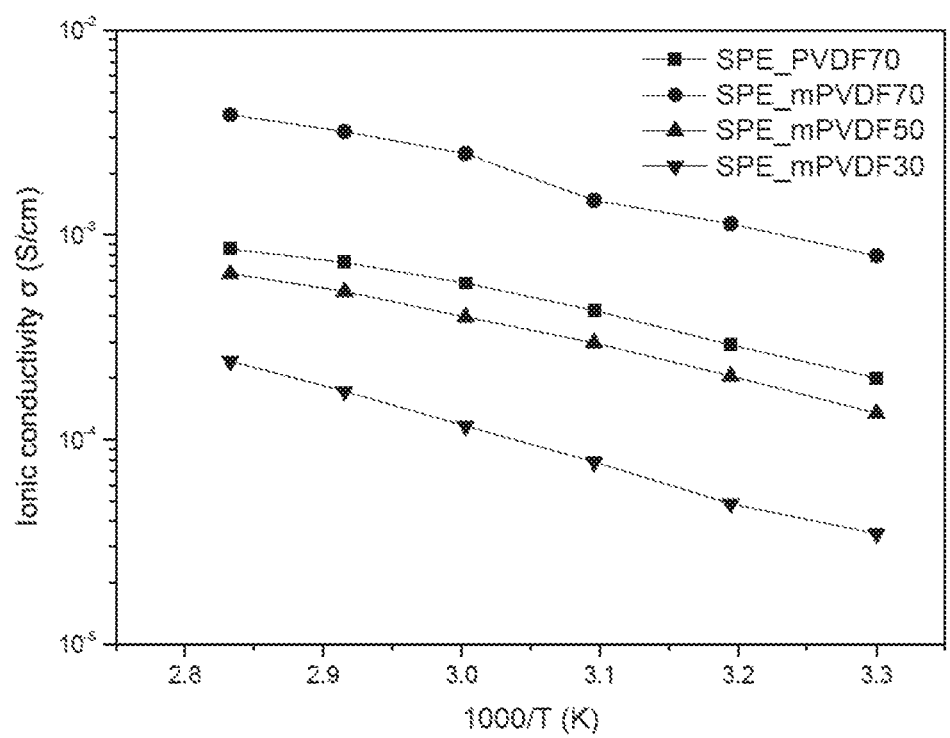
FIG. 5 is a graph of the test results of ionic conductivity of the embodiment 1-9 of the energy storage device having the copolymer PGG4-EO as a solid electrolyte membrane.

Place the polymer electrolytes produced in embodiment 1-14 and embodiment 1-15 respectively between two pieces of stainless steel as reference electrode and working electrode to form a coin cell. Place the coin cell in a convection oven to measure the ionic conductivity at different temperatures by an increment of 10° C. each time, for example, at 30° C., 40° C., 50° C., 60° C., 70° C., 80° C. FIG. 5 is the data chart of ionic conductivity.

Embodiment 1-18: Discharge Capacitance of a Solid Electrolyte Membrane

Figure 6:
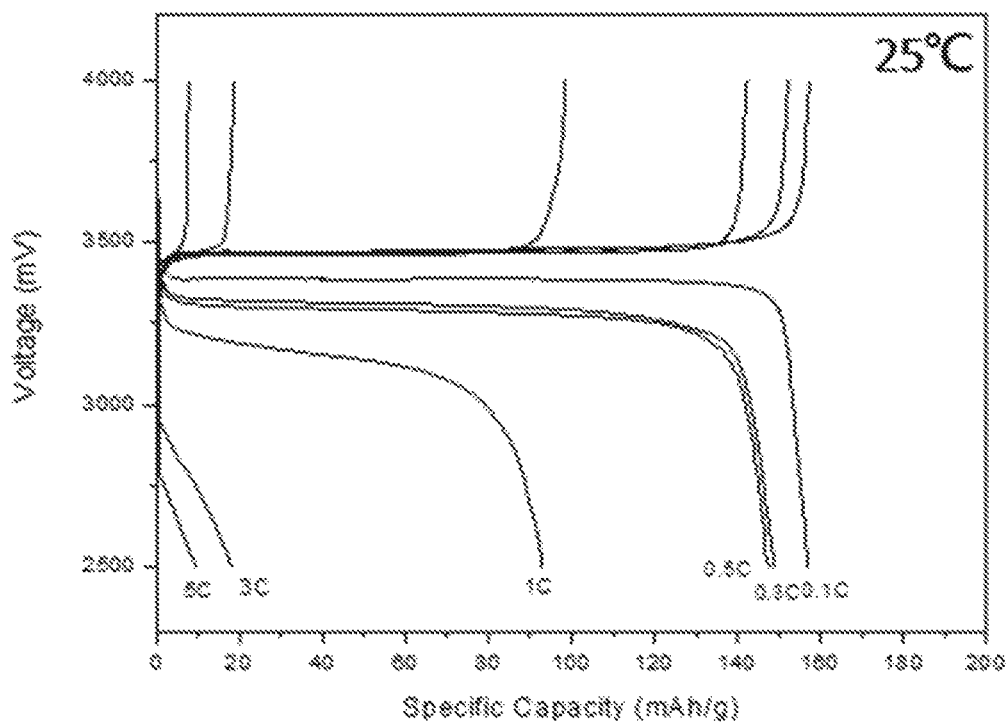
FIG. 6 is a graph of the test results of the embodiment 1-9 of the energy storage device having the copolymer PGG4-EO as a solid electrolyte membrane in ambient temperature.
Figure 7:
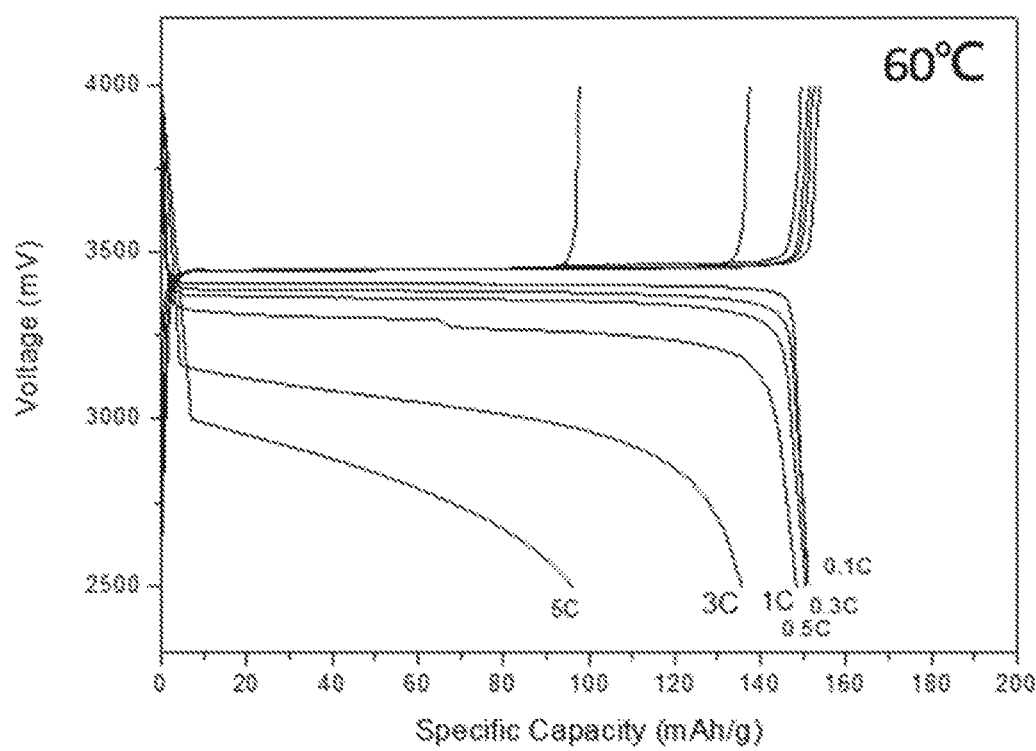
FIG. 7 is a graph of the test results of the embodiment 1-9 of the energy storage device having the copolymer PGG4-EO as a solid electrolyte membrane in high temperature.

Use the low electric current, automatic charge/discharge performance test system (AcuTech Systems, BAT-750B) to measure the efficiency of charge/discharge performance of the button cell battery produced in embodiment 1-16. The electric potential setting ranges between 2.5~4.0V; the charge current setting is 0.1 C; the discharge current setting is set as 0.1 C, 0.3 C, 0.5 C, 1 C, 3 C, and 5 C. The test results are shown in FIG. 6 and FIG. 7 for discharge capacitance values of SPE_mPVDF70 solid electrolyte membrane at different discharge current densities in an ambient temperature of 25° C. and 60° C. respectively.

Embodiment 1-19: Preparation of LiFePO$_4$ Positive Electrode Plates

Dissolve 0.1 g of PGG4-EO, PGG11-EO, PGG29-EO copolymers produced in embodiments 1-9, 1-10, and 1-11 respectively in DMSO (3 grams) separately; then add 0.1 g of Super P (TIMCAL Ltd.) and 0.8 g of (LiFePO$_4$) individually and stir thoroughly. Paste the completely mixed slurry on an aluminum foil. Place the aluminum foil in a vacuum oven, heated to 100° C., for 24 hours. After the applied coatings are dried, the aluminum foil coated with the slurry is rolled using a roller. In this way, LiFePO$_4$ positive electrode plates that comprise PGG4-EO, PGG11-EO, PGG29-EO copolymers as the binders respectively are produced.

Figure 8:
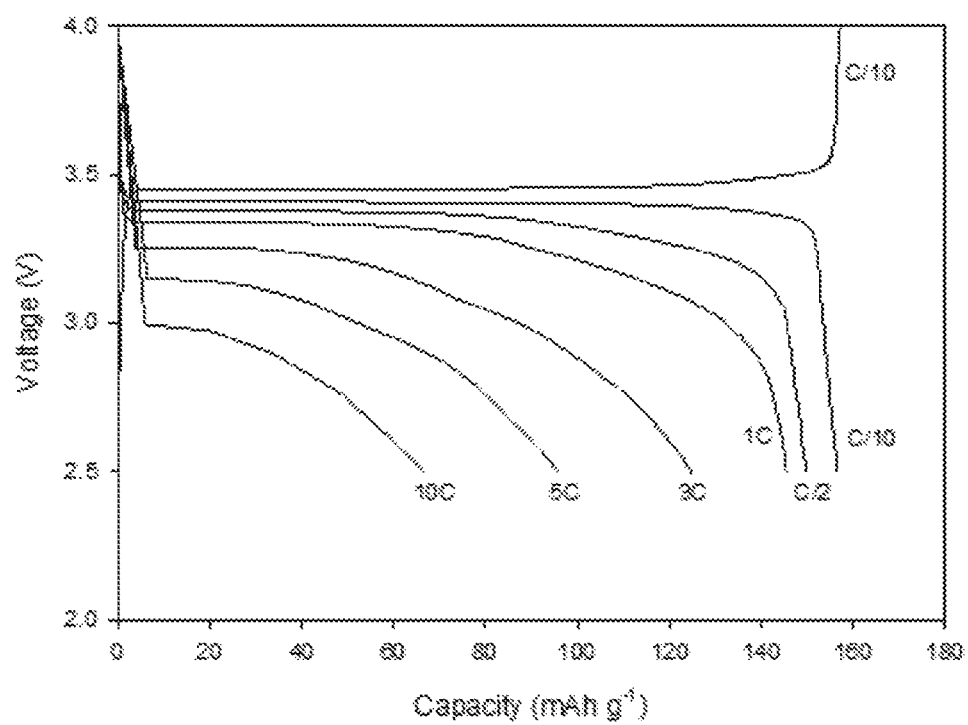
FIG. 8 is a graph of the test results of the embodiment 1-9 of the energy storage device having the copolymer PGG4-EO as a binder of the positive electrode.
Figure 9:
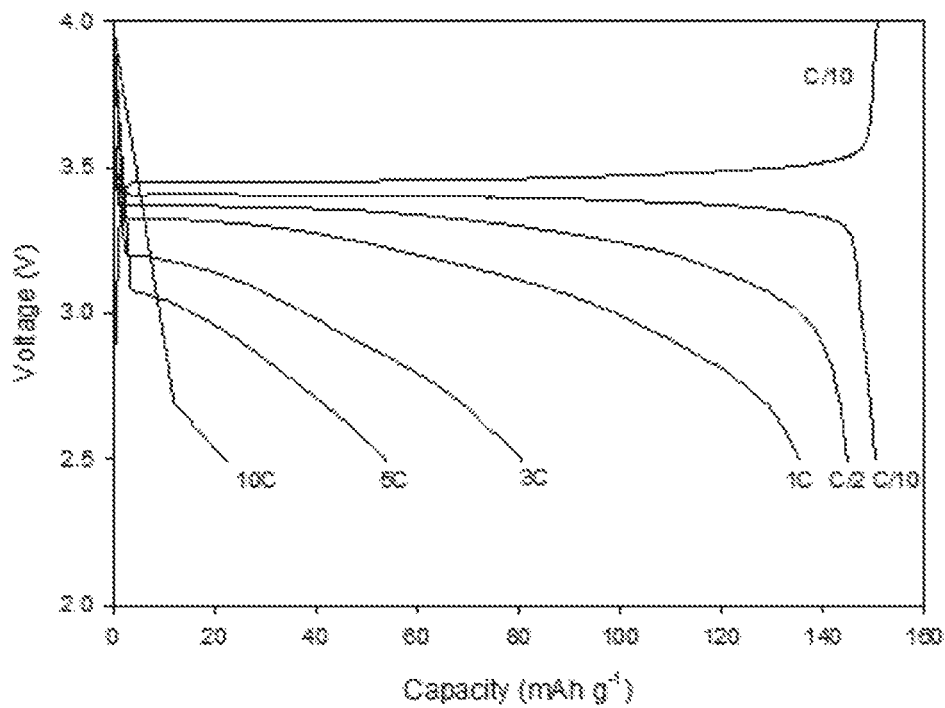
FIG. 9 is a graph of the test results of the embodiment 1-10 of the energy storage device having the copolymer PGG11-EO as a binder of the positive electrode.
Figure 10:
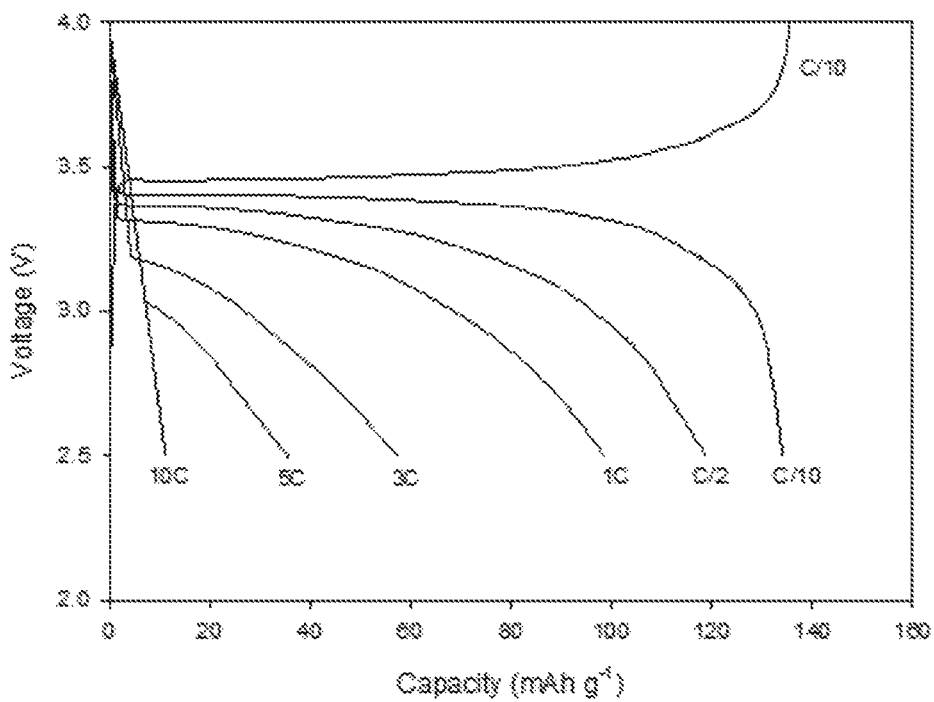
FIG. 10 is a graph of the test results of the embodiment 1-11 of the energy storage device having the copolymer PGG29-EO as a binder of the positive electrode.

Embodiment 1-19: Preparation and Charge/Discharge Performance Tests of the Energy Storage Device of the Present Invention The LiFePO$_4$ positive electrode plates produced in embodiment 1-19 are assembled in form of a button cell battery individually. First, place the commercially available polypropylene (PP) membrane between the aforementioned LiFePO$_4$ positive electrode and the lithium metal negative electrode to produce the energy storage device of the present invention. Use an 8-channel, low electric current, automatic charge/discharge performance test system (AcuTech Systems, BAT-750B) to measure the efficiency of charge/discharge performance of the energy storage device of the present invention. The electric potential setting ranges between 2.5~4.0V; the charge current setting is 0.1 C; the discharge current setting is set as 0.1 C, 0.5 C, 1 C, 3 C, 5 C, and 10 C. The test results are shown in FIG. 8, FIG. 9, and FIG. 10. FIG. 8, FIG. 9, and FIG. 10 illustrate individually the discharge capacitance of the energy storage device containing a LiFePO$_4$ positive electrode kneaded with the binder of the present invention at different discharge current densities wherein FIG. 8 is a graph of the test results of the embodiment 1-9 of the energy storage device having the copolymer PGG4-EO as a binder of the positive electrode; FIG. 9 is a graph of the test results of the embodiment 1-10 of the energy storage device having the copolymer PGG11-EO as a binder of the positive electrode; and FIG. 10 is a graph of the test results of the embodiment 1-11 of the energy storage device having the copolymer PGG29-EO as a binder of the positive electrode.

The discharge capacitance values, generated by the aforementioned energy storage device at different current settings, are shown in Table 5, Table 6, and Table 7.

TABLE 5

Capacitance of the binder in embodiment 1-9 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 156.4 | 149.9 | 145.5 | 124.7 | 96.4 | 66.6 |

TABLE 6

Capacitance of the binder in embodiment 1-10 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 150.3 | 144.9 | 135.4 | 80.5 | 53.7 | 22.5 |

TABLE 7

Capacitance of the binder in embodiment 1-11 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 122.9 | 98 | 81.7 | 52.4 | 38.5 | 20.6 |

Based on the test results displayed in FIG. 8 to FIG. 10 and Table 5 to Table 7, it is confirmed that the energy storage devices containing a LiFePO$_4$ positive electrode kneaded with the binders produced in embodiments 1-9 to 1-11 respectively have excellent efficiency of charge/discharge performance.

Figure 11:
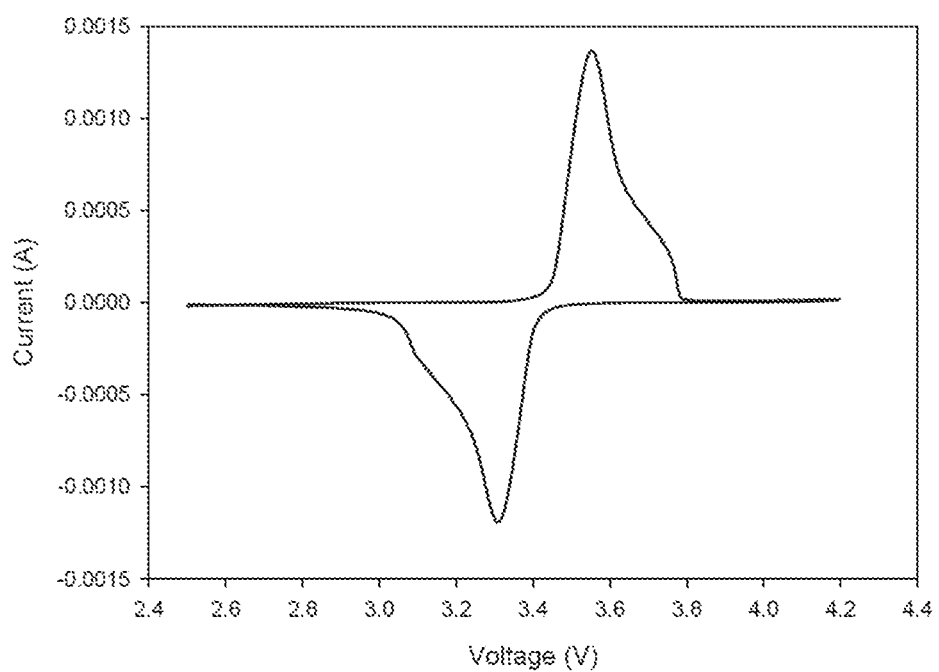
FIG. 11 is a graph of the test results of the embodiment 1-9 of the energy storage device having the copolymer PGG4-EO as a binder of the positive electrode.
Figure 12:
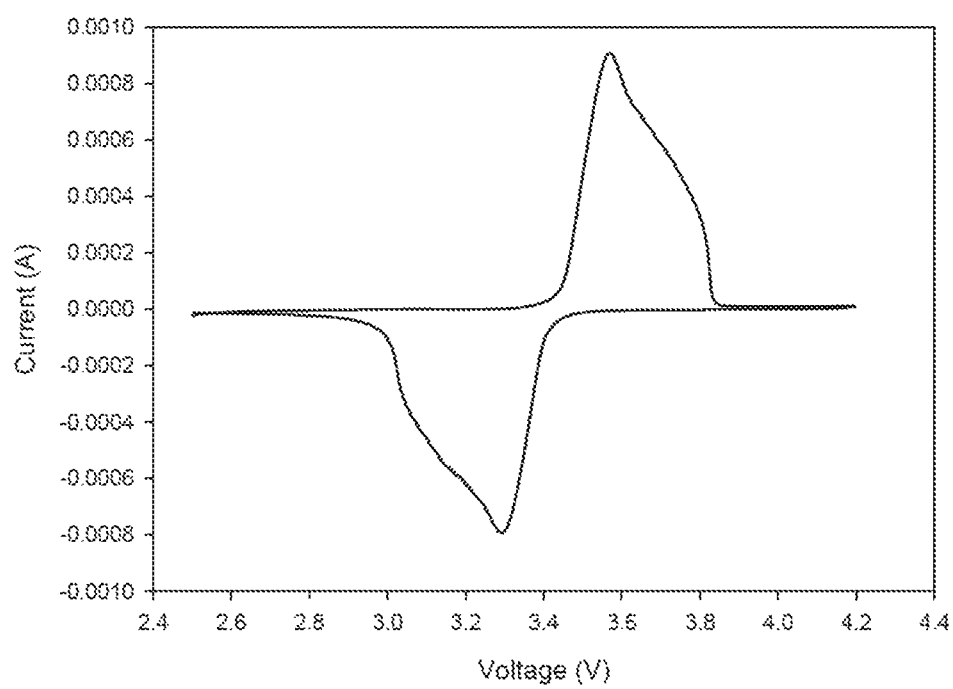
FIG. 12 is a graph of the test results of the embodiment 1-10 of the energy storage device having the copolymer PGG11-EO as a binder of the positive electrode.

Embodiment 1-21: Preparation and Cyclic Voltammetry Tests of the Energy Storage Device of the Present Invention The LiFePO$_4$ positive electrode plates produced in embodiment 1-19 are assembled in form of a button cell battery separately to form the energy storage device of the present invention. Use an electrochemical analyzer (CHI6081A) to scan the electric potential range of the assembled button cell battery. The scan of the electric potential ranges between 2.5~4.2V and the scanning speed is 0.1 mV/S to perform the cyclic voltammetry tests. The test results are shown in FIG. 8 and FIG. 9. FIG. 11 is a graph of the test results of the embodiment 1-9 of the energy storage device having the copolymer PGG4-EO as a binder of the positive electrode; FIG. 12 is a graph of the test results of the embodiment 1-10 of the energy storage device having the copolymer PGG11-EO as a binder of the positive electrode.

The $LiFePO_4$ positive electrode plates kneaded with the binders PGG4-EO and PGG11-EO produced in embodiment 1-10 and 1-11 are assembled in form of a button cell battery separately to form the energy storage device of the present invention. Use an electrochemical analyzer (CHI6081A) to scan the electric potential range of the assembled button cell battery. The scan of the electric potential ranges between 2.5~4.2V and the scanning speed is 0.1 mV/S to perform the cyclic voltammetry tests. The test results during the second cyclic voltammetry produce an overlay graph and are shown in FIG. 13.

Figure 13:
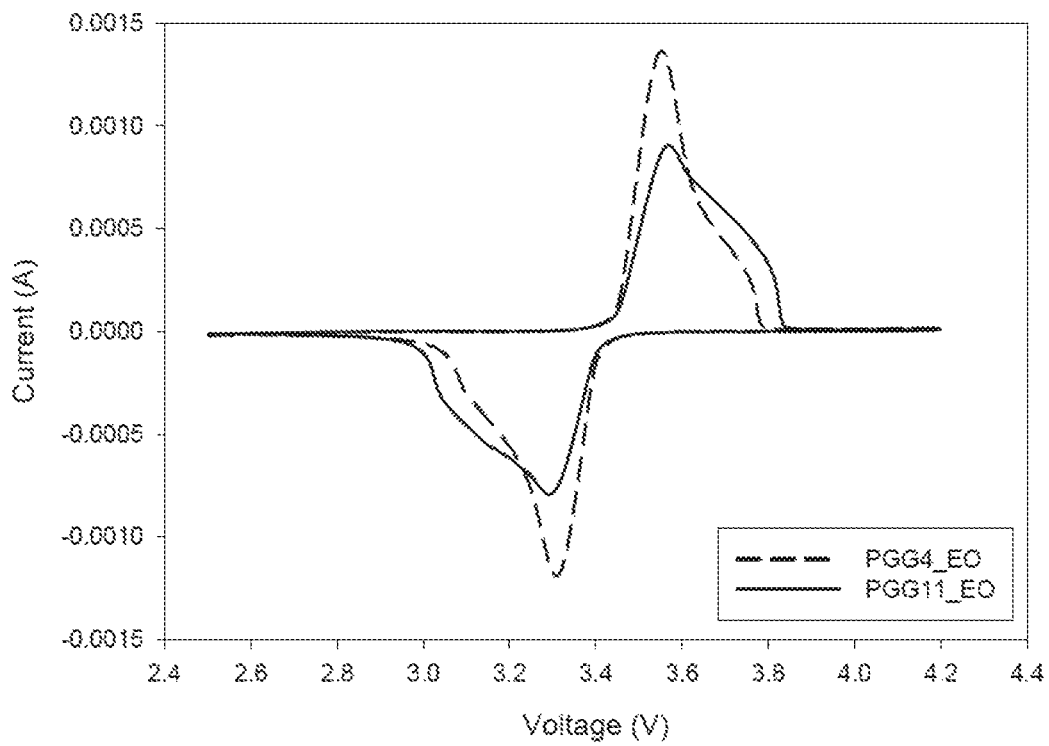
FIG. 13 is an overlay graph of the test results during the second cyclic voltammetry.

Based on the test results displayed in FIG. 12 and FIG. 13, it is confirmed that the $LiFePO_4$ positive electrodes kneaded with the binders produced in embodiments 1-9 to 1-11 respectively can help the energy storage device with such $LiFePO_4$ positive electrode to gain excellent efficiency during charge/discharge process.

Embodiment 1-22: Preparation of the Negative Electrode Plates

Add 0.1 g of Super P (TIMCAL Ltd.) and 0.8 g of graphite individually into 0.1 g of PGG4-EO binder, produced in embodiment 1-9, and stir thoroughly. Paste the completely mixed slurry on a copper foil. Place the copper foil in a vacuum oven, heated to 100° C., for 24 hours. After the applied coatings are dried, the copper foil coated with the slurry is rolled using a roller. In this way, the $LiFePO_4$ negative electrode plate is produced that comprises PGG4-EO copolymer as the binder.

Figure 14:
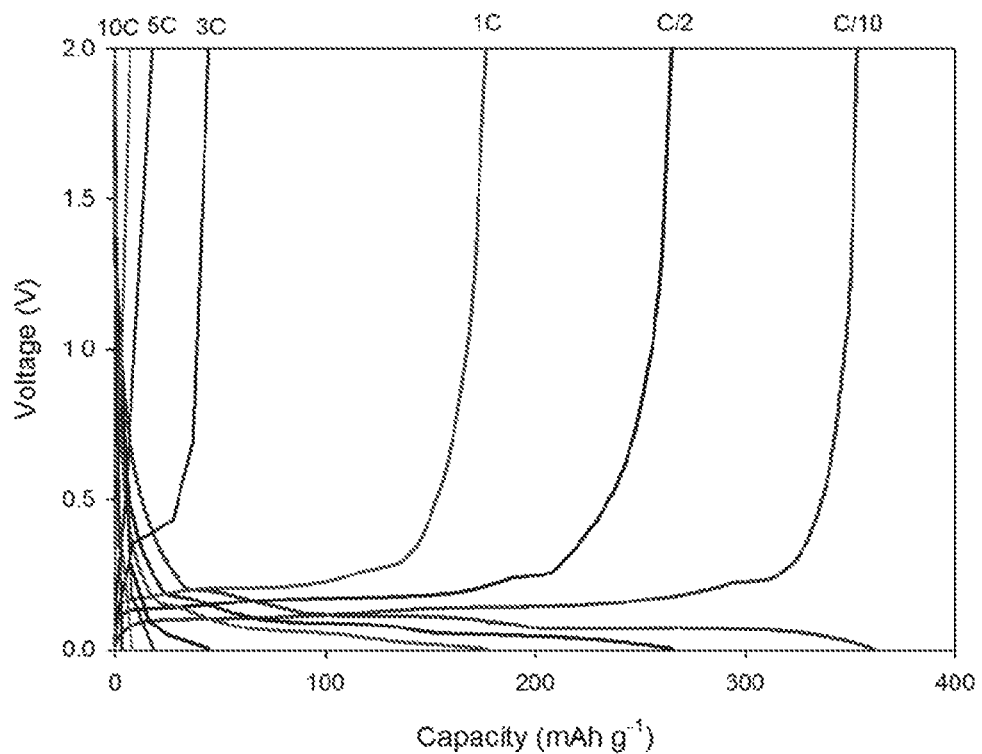
FIG. 14 is a graph of the test results of the embodiment 1-9 of the energy storage device having the copolymer PGG4-EO as a binder of the negative electrode.

Embodiment 1-23: Preparation and Charge/Discharge Performance Tests of the Energy Storage Device of the Present Invention The negative electrodes produced in embodiment 1-22 are assembled in form of a button cell battery individually. First, place the commercially available polypropylene (PP) membrane between the aforementioned graphite negative electrode and the lithium metal negative electrode. The test results are displayed in FIG. 14. FIG. 14 is a graph of the test results of the embodiment 1-9 of the energy storage device having the copolymer PGG4-EO as a binder of the negative electrode.

The discharge capacitance values, generated by the aforementioned energy storage device at different current settings, are shown in Table 8.

TABLE 8

Capacitance of the binder in embodiment 1-9 corresponding to different charge/discharge electric current values

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 386 | 348 | 286 | 140 | 68 | 26 |

Based on the test results displayed in FIG. 14 and Table 8, it is confirmed that the negative electrode kneaded with the binder produced in embodiments 1-9 can help the energy storage device with such negative electrode to gain excellent efficiency during charge/discharge process.

Embodiment 2

Embodiment 2-1: Synthesis of Lithium 2-Aminoethanesulfonate (LAES)

Place 2-aminoethanesulfonic acid (AESA) in the reactor and add LiOH·H2O for reaction. After the reaction is completed, drain all the water to obtain LAES powder.

The reaction process of embodiments 2-1 is described as follows:

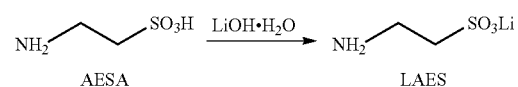

Embodiment 2-2: Preparation of Sulfonate-Containing Copolymer

Place the (P(VDF-co-CTFE))-containing PGG4 copolymer produced in embodiment 1-1 and the LAES produced in embodiment 2-1 in a reactor for reaction for 3 hours. The reaction will produce the sulfonate-containing copolymers utilized in the energy storage device of the present invention. The product produced in embodiment 2-2 is named SPGG4.

Embodiment 2-3: Preparation of Sulfonate-Containing Copolymer

Place the (P(VDF-co-CTFE))-containing PGG11 copolymer produced in embodiment 1-2 and the LAES produced in embodiment 2-1 in a reactor for reaction for 3 hours. The reaction will produce the sulfonate-containing copolymers utilized in the energy storage device of the present invention. The product produced in embodiment 2-3 is named SPGG11.

Embodiment 2-4: Preparation of Sulfonate-Containing Copolymer

Place the (P(VDF-co-CTFE))-containing PGG29 copolymer produced in embodiment 1-3 and the LAES produced in embodiment 2-1 in a reactor for reaction for 3 hours. The reaction will produce the sulfonate-containing copolymers utilized in the energy storage device of the present invention. The product produced in embodiment 2-4 is named SPGG29.

The reaction process of embodiments 2-2 to 2-4 is described as follows:

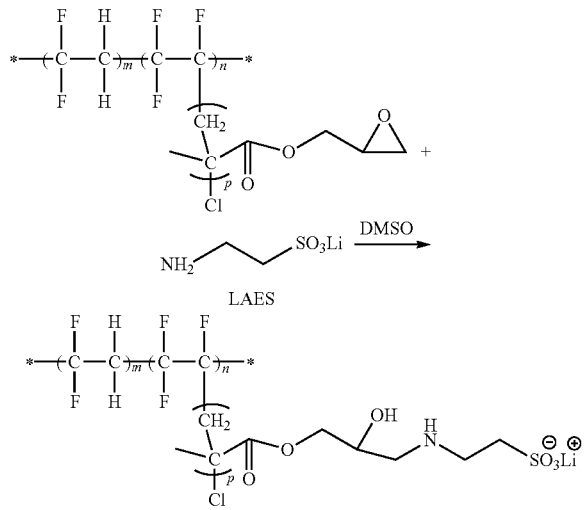

wherein in terms of the amount of the repeating units m ranges from 200~35000; n ranges from 200~35000; p ranges from 1~1000. In terms of the ratio of the repeating units m and n, m/(m+n) ranges from 0.01~0.99; n/(m+n) ranges from 0.01~0.99.

Embodiment 2-5: Preparation of LiFePO$_4$ Positive Electrode Plates

Copolymers SPGG4, SPGG11, SPGG29 produced in embodiments 2-2, 2-3, and 2-4 are applied as binders. Take 0.1 g of SPGG4, SPGG11, SPGG29 copolymers separately; then add 0.1 g of Super P (TIMCAL Ltd.) and 0.8 g of (LiFePO$_4$) individually and stir thoroughly. Paste the completely mixed slurry on an aluminum foil. Place the aluminum foil in a vacuum oven, heated to 100° C., for 120 hours. After the applied coatings are dried, retrieve the aluminum foil from the vacuum oven. In this way, LiFePO$_4$ positive electrode plates that comprise SPGG4, SPGG11, SPGG29 copolymers as the binders respectively are produced.

Figure 15:
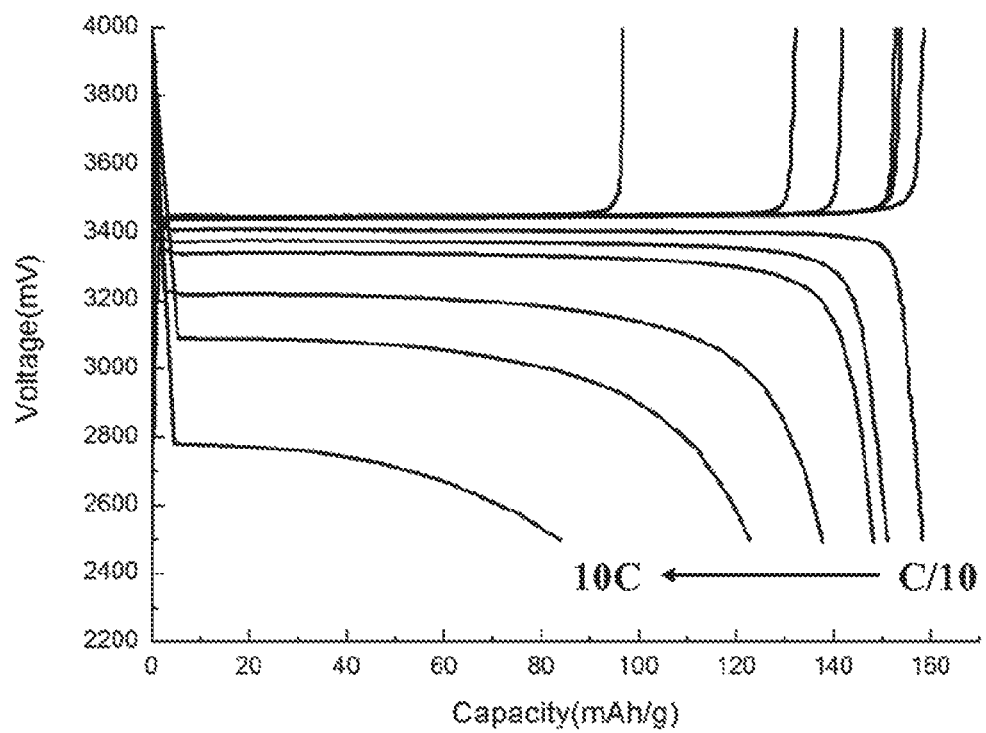
FIG. 15 is a graph of the test results of the embodiment 2-2 of the energy storage device having the copolymer SPGG4 as a binder of the positive electrode.
Figure 16:
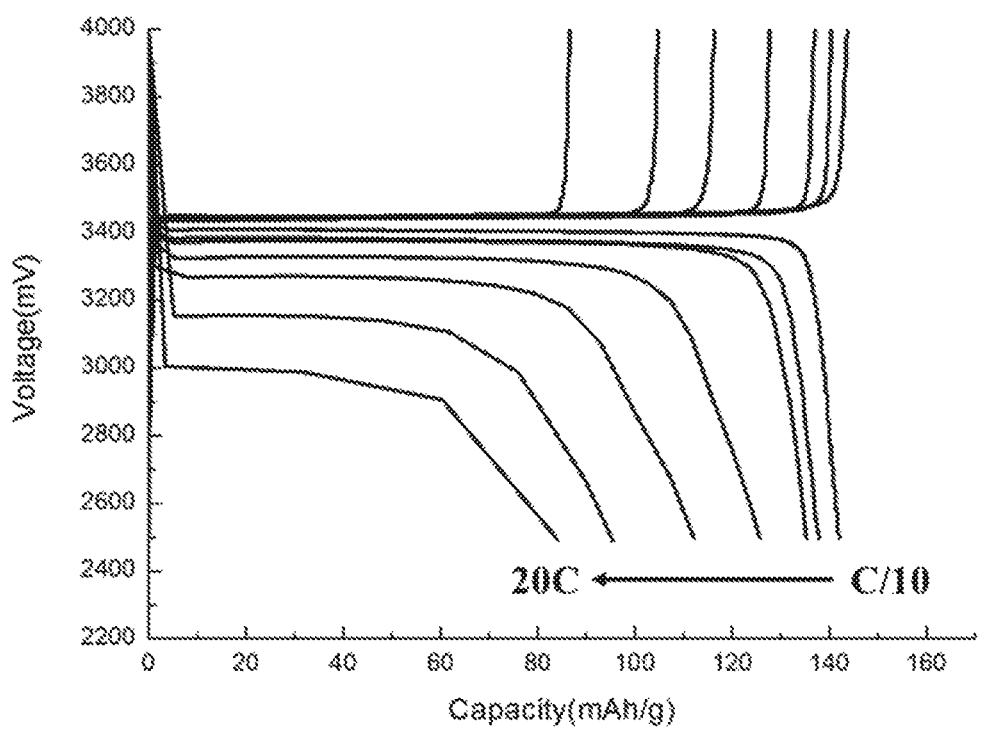
FIG. 16 is a graph of the test results of the embodiment 2-4 of the energy storage device having the copolymer SPGG29 as a binder of the positive electrode.

Embodiment 2-6: Preparation and Charge/Discharge Performance Tests of the Energy Storage Device of the Present Invention The LiFePO$_4$ positive electrode plates produced in embodiment 2-5 are assembled in form of a button cell battery individually. First, place the commercially available polypropylene (PP) membrane between the aforementioned LiFePO$_4$ positive electrode and the lithium metal negative electrode to produce the energy storage device of the present invention. Use an 8-channel, low electric current, automatic charge/discharge performance test system (AcuTech Systems, BAT-750B) to measure the efficiency of charge/discharge performance of the energy storage device of the present invention. The electric potential setting ranges between 2.5~4.0V; the charge current setting is 0.1 C; the discharge current setting is set as 0.1 C, 0.5 C, 1 C, 3 C, 5 C, and 10 C. The test results are shown in FIG. 15 and FIG. 16, wherein FIG. 15 is a graph of the test results of the embodiment 2-2 of the energy storage device having the copolymer SPGG4 as a binder of the positive electrode; FIG. 16 is a graph of the test results of the embodiment 2-4 of the energy storage device having the copolymer SPGG29 as the binder of the positive electrode.

Based on the test results displayed in FIG. 15 and FIG. 16, it is confirmed that the LiFePO$_4$ positive electrode kneaded with the binders produced in embodiments 2-2, 2-3, and 2-4 respectively can help the energy storage device with such LiFePO$_4$ positive electrode to gain excellent efficiency during charge/discharge process.

Embodiment 2-7: Preparation of the Negative Electrode Plates

Copolymers SPGG4, SPGG11, SPGG29 produced in embodiments 2-2, 2-3, and 2-4 are applied as binders. Take 0.1 g of SPGG4, SPGG11, SPGG29 copolymers separately; then add 0.1 g of Super P (TIMCAL Ltd.) and 0.8 g of graphite individually and stir thoroughly. Paste the completely mixed slurry on the copper foil. Place the copper foil in a vacuum oven, heated to 100° C., for 120 hours. After the applied coatings are dried, retrieve the copper foil from the vacuum oven. In this way, negative electrode plates that comprise SPGG4, SPGG11, SPGG29 copolymers as the binders respectively are produced.

Embodiment 2-8: Preparation and Charge/Discharge Performance Tests of the Energy Storage Device of the Present Invention The negative electrode plates produced in embodiment 2-7 are assembled in form of a button cell battery individually. First, place the commercially available polypropylene (PP) membrane between the aforementioned negative electrode and the lithium metal positive electrode to produce the energy storage device of the present invention. Use an 8-channel, low electric current, automatic charge/discharge performance test system (AcuTech Systems, BAT-750B) to measure the efficiency of charge/discharge performance of the energy storage device of the present invention. The electric potential setting ranges between 0~2.0V; the discharge current setting is 0.1 C; the charge current setting is set as 0.1 C, 0.5 C, 1 C, 3 C, and 5 C. The test results are shown in FIG. 17, wherein FIG. 17 is a graph of the test results of the embodiment 2-4 of the energy storage device having the copolymer SPGG29 as a binder of the negative electrode.

Figure 17:
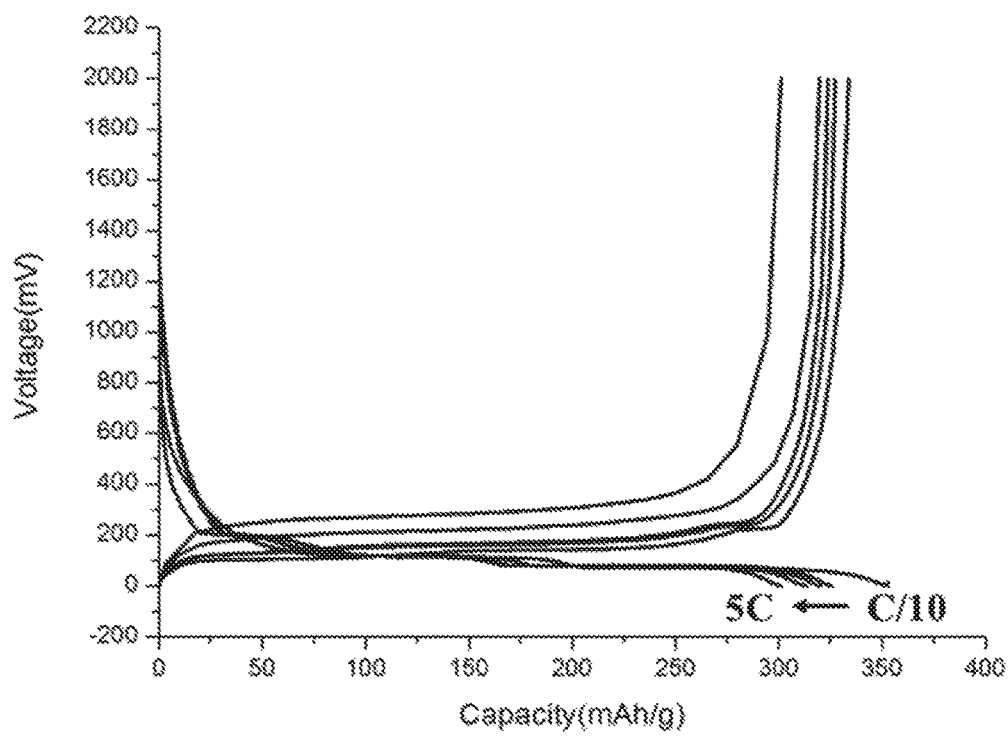
FIG. 17 is a graph of the test results of the embodiment 2-4 of the energy storage device having the copolymer SPGG29 as a binder of the negative electrode.

Based on the test results displayed in FIG. 17, it is confirmed that the negative electrode kneaded with the binders produced in embodiments 2-2, 2-3, and 2-4 respectively can help the energy storage device with such negative electrode to gain excellent efficiency during charge/discharge process.

Embodiment 3

Embodiment 3-1: Preparation of Br-PVDF-g-PGMA

Dissolve 2 g of PVDF-g-PGMA, produced in embodiment 1-4, in DMSO (10 grams). Then, add HBr for reaction for 24 hours. After the reaction is completed, slowly pour the polymer solution into methanol for precipitation; the precipitated material is Br-PVDF-g-PGMA.

Embodiment 3-2: Preparation of Quaternary Ammonium-Containing Copolymer

Dissolve 2 g of Br-PVDF-g-PGMA in DMSO (10 grams). Then, heat the solution to 80° C. Add 1-methylimidazole to the solution and stir for reaction for 12 hours. After, add a proper amount of LiTFSI and slowly pour the polymer solution into water for precipitation. Dry the precipitated material in an oven at 80° C. for 12 hours to produce PVDF-g-PQA.

The reaction process of embodiments 3-1 to 3-2 is described as follows:

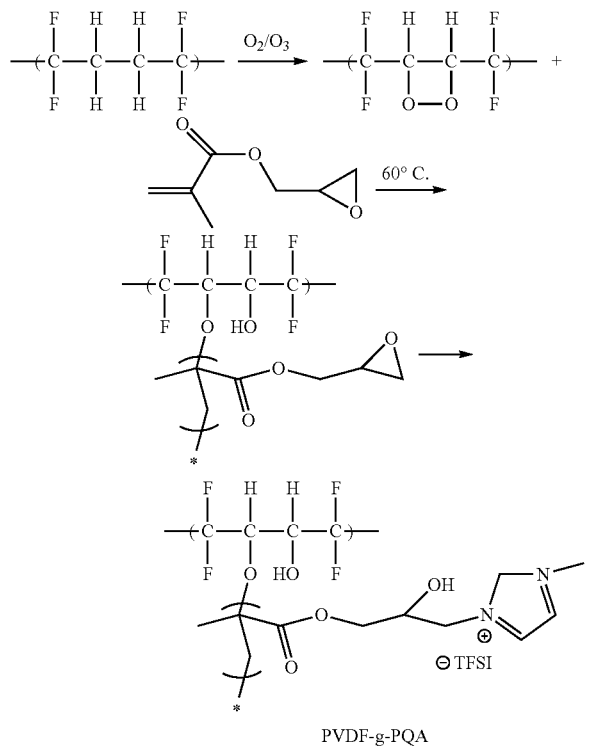

PVDF-g-PQA

Embodiment 3-3: Preparation of LiFePO$_4$ Positive Electrode Plates

Add 0.1 g of Super P (TIMCAL Ltd.) and 0.8 g of LiFePO$_4$ individually in 0.1 g of PVDF-g-PQA, produced in embodiments 3-2, and stir thoroughly. Paste the completely mixed slurry on an aluminum foil. Place the aluminum foil in a vacuum oven, heated to 100° C., for 120 hours. After the applied coatings are dried, retrieve the aluminum foil from the vacuum oven. In this way, LiFePO$_4$ positive electrode plates that comprise PVDF-g-PQA copolymer, produced in embodiment 3-2, as the binder are produced.

Figure 18:
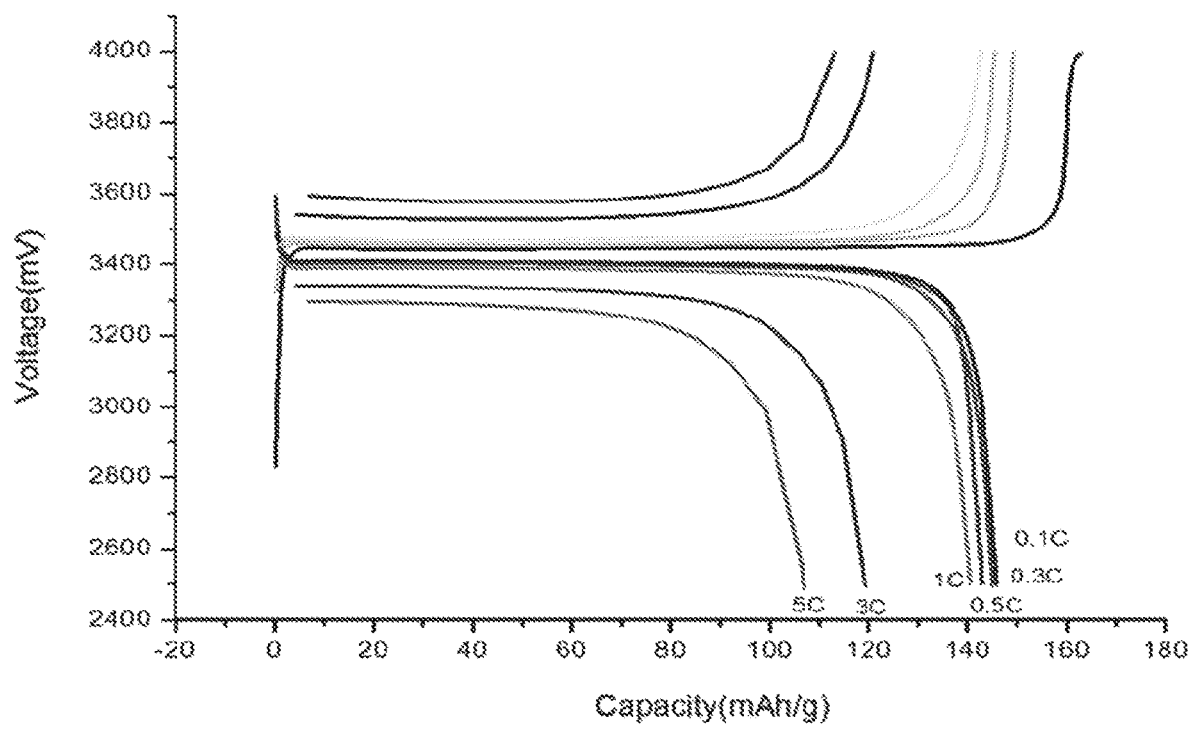
FIG. 18 is a graph of the test results of the embodiment 3-3 of the energy storage device having the copolymer PVDF-g-PQA as a binder of the positive electrode.

Preparation and Charge/Discharge Performance Tests of the Energy Storage Device of the Present Invention The LiFePO$_4$ positive electrode plates produced in embodiment 3-3 are assembled in form of a button cell battery. Place the commercially available polypropylene (PP) membrane between the aforementioned LiFePO$_4$ positive electrode and the lithium metal negative electrode to produce the energy storage device of the present invention. Use an 8-channel, low electric current, automatic charge/discharge performance test system (AcuTech Systems, BAT-750B) to measure the efficiency of charge/discharge performance of the energy storage device of the present invention. The electric potential setting ranges between 2.5~4.0V; the charge current setting is 0.1 C; the discharge current setting is set as 0.1 C, 0.5 C, 1 C, 3 C, 5 C, and 10 C. The test results are shown in FIG. 18, wherein FIG. 18 is a graph of the test results of the embodiment 3-3 of the energy storage device having the copolymer PVDF-g-PQA as a binder of the positive electrode.

The discharge capacitance values, generated by the aforementioned energy storage device at different current settings, are shown in Table 9.

TABLE 9

Capacitance of the binder in embodiment 3-3 corresponding to different charge/discharge electric current values

| | Discharge Rate (C-rate) | | | | |
|---|---|---|---|---|---|
| | C/10 | C/2 | 1 C | 3 C | 5 C |
| Capacitance (mAh g$^{-1}$) | 146 | 143 | 140 | 120 | 108 |

Based on the test results shown in FIG. 18 and Table 9, it is confirmed that the LiFePO$_4$ positive electrode kneaded with the binder produced in embodiments 3-3 can help the energy storage device with such LiFePO$_4$ positive electrode to gain excellent efficiency during charge/discharge process.

Embodiment 4: Mixture of SPGG29/PAN

Embodiment 4-1: Preparation of LiFePO$_4$ Positive Electrode Plates

Take 0.05 g of SPGG29, produced in embodiment 2-4, and PAN separately; then add 0.1 g of Super P (TIMCAL Ltd.) and 0.8 g of (LiFePO$_4$) individually and stir thoroughly. Paste the completely mixed slurry on an aluminum foil. Place the aluminum foil in a vacuum oven, heated to 100° C., for 120 hours. After the applied coatings are dried, retrieve the aluminum foil from the vacuum oven. In this way, LiFePO$_4$ positive electrode plates that comprise SPGG29/PAN copolymer as the binder are produced.

Figure 19:
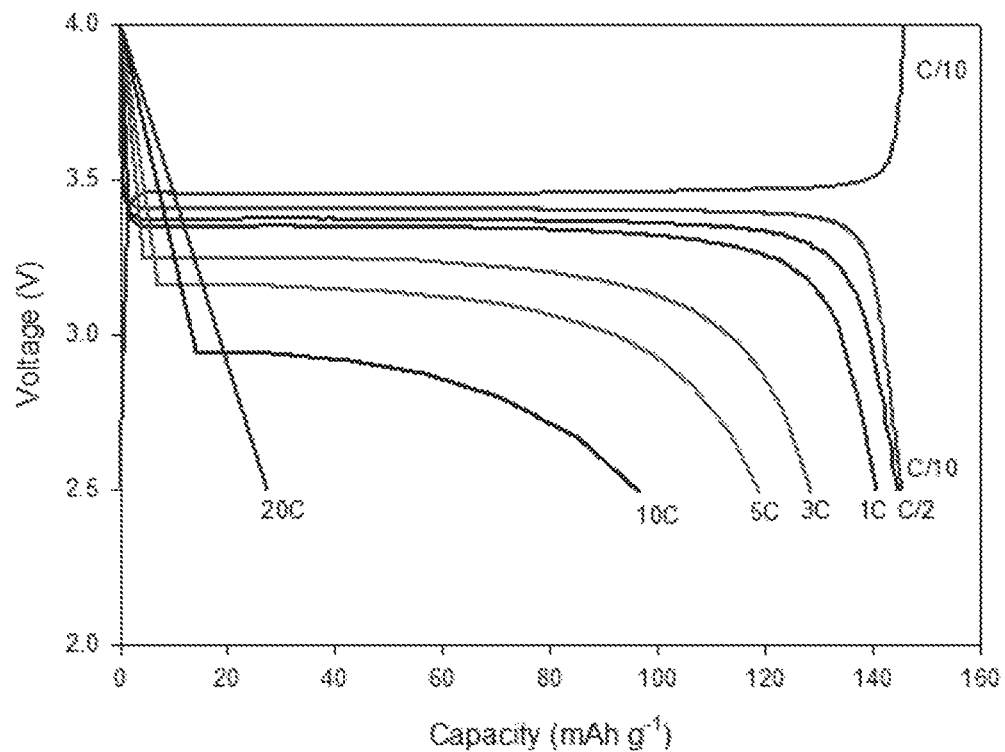
FIG. 19 is a graph of the test results of the embodiment 4 of the energy storage device having the copolymer SPGG29/PAN as a binder of the positive electrode.
Figure 20:
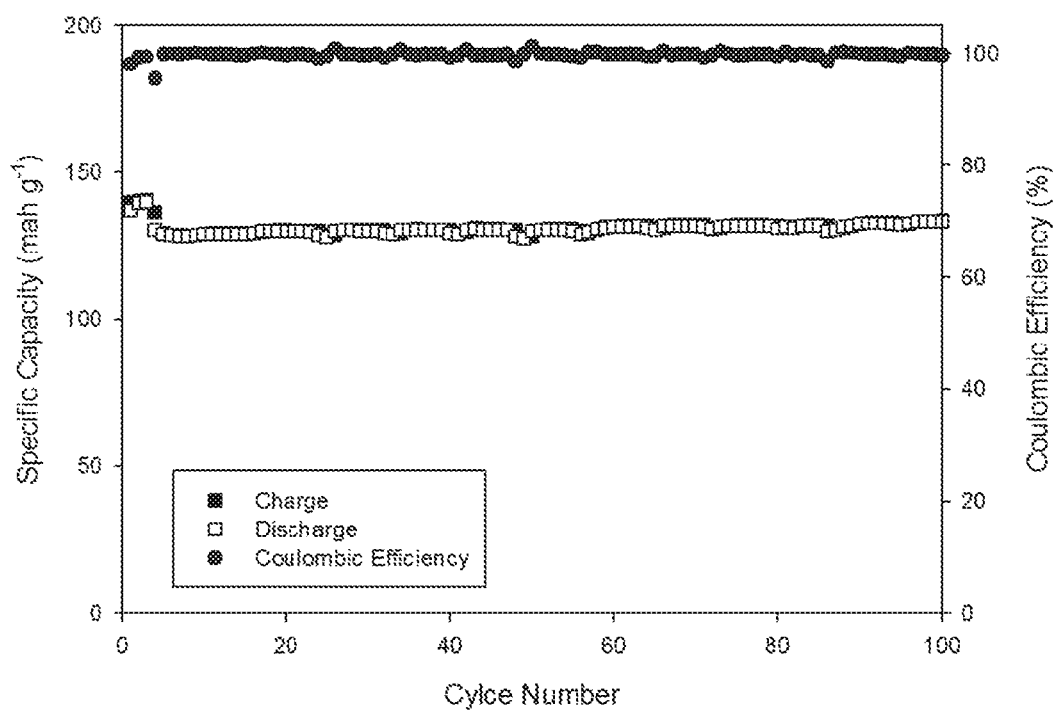
FIG. 20 is a graph of the test results of the embodiment 4 of the energy storage device having the copolymer SPGG29/PAN as a binder of the positive electrode.

Embodiment 4-2: Preparation and Charge/Discharge Performance Tests of the Energy Storage Device of the Present Invention The LiFePO$_4$ positive electrode plates produced in embodiment 4-1 are assembled in form of a button cell battery individually. Place the commercially available polypropylene (PP) membrane between the aforementioned LiFePO$_4$ positive electrode and the lithium metal negative electrode to produce the energy storage device of the present invention. Use an 8-channel, low electric current, automatic charge/discharge performance test system (AcuTech Systems, BAT-750B) to measure the efficiency of charge/discharge performance of the energy storage device of the present invention. The electric potential setting ranges between 2.5~4.0V; the charge current setting is 0.1 C; the discharge current setting is set as 0.1 C, 0.5 C, 1 C, 3 C, 5 C, and 10 C. FIG. 19 and FIG. 20 are graphs of the test results of the energy storage device having the copolymer SPGG29/PAN, produced in embodiment 4-1, as a binder of the positive electrode.

The discharge capacitance values, generated by the energy storage device in embodiment 4-1 at different current settings, are shown in Table 10.

TABLE 10

| | Discharge Rate (C-rate) | | | | | |
| --- | --- | --- | --- | --- | --- | --- |
| | C/10 | C/2 | 1 C | 3 C | 5 C | 10 C |
| Capacitance (mAh g$^{-1}$) | 145 | 145 | 141 | 128 | 119 | 96 |

Based on the test results shown in FIG. 19~FIG. 20 and Table 10, it is confirmed that the LiFePO$_4$ positive electrode kneaded with the binder produced in embodiments 4-1 can help the energy storage device with such LiFePO$_4$ positive electrode to gain excellent efficiency during charge/discharge process.

Comparative Example 1: Pristine PVDF (Positive Electrode)

The Pristine PVDF of Comparative Example 1 is ungrafted polyvinylidene difluoride (purchased from Arkema).

Comparative Example 1-1

Take 0.1 g of Pristine PVDF in comparative example 1; then add 0.1 g of Super P (TIMCAL Ltd.) and 0.8 g of (LiFePO$_4$) individually and stir thoroughly. Paste the completely mixed slurry on an aluminum foil. Place the aluminum foil in a vacuum oven, heated to 100° C., for 120 hours. After the applied coatings are dried, retrieve the aluminum foil from the vacuum oven. In this way, LiFePO$_4$ positive electrode plates that comprise Pristine PVDF, produced in comparative example 1, as the binder are produced.

Comparative Example 1-2

Figure 21:
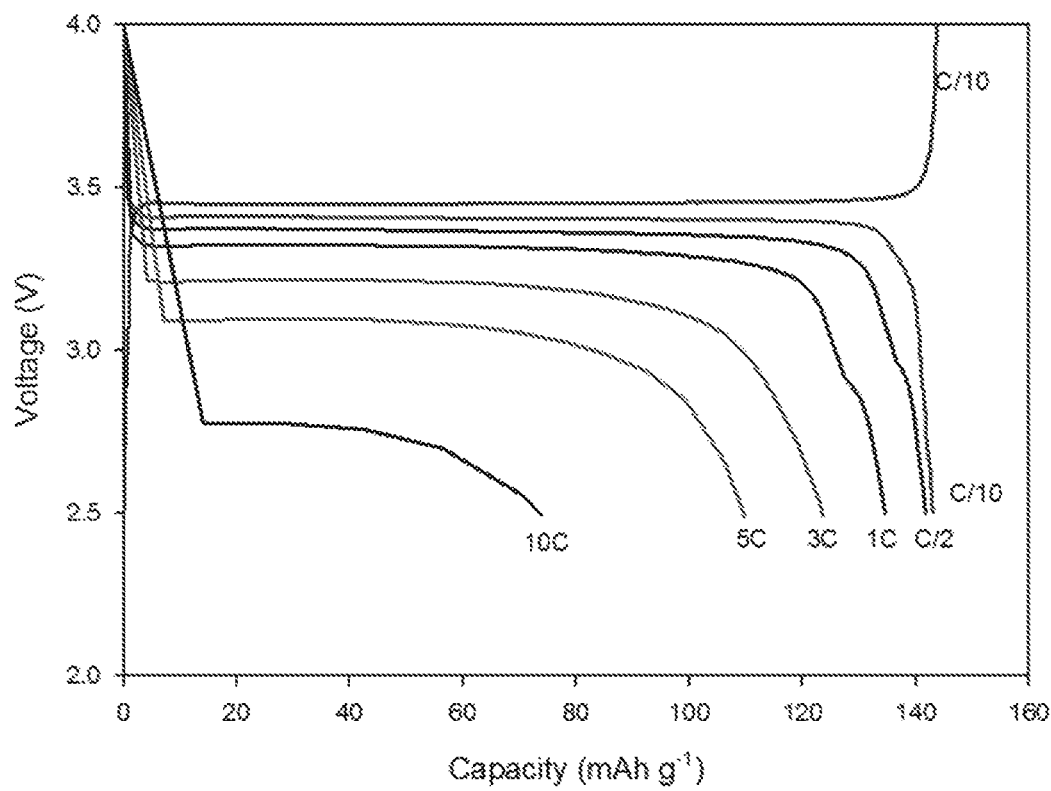
FIG. 21 is a graph of the test results of the energy storage device that uses PVDF, produced in comparative example 1, as a binder of the positive electrode.
Figure 22:
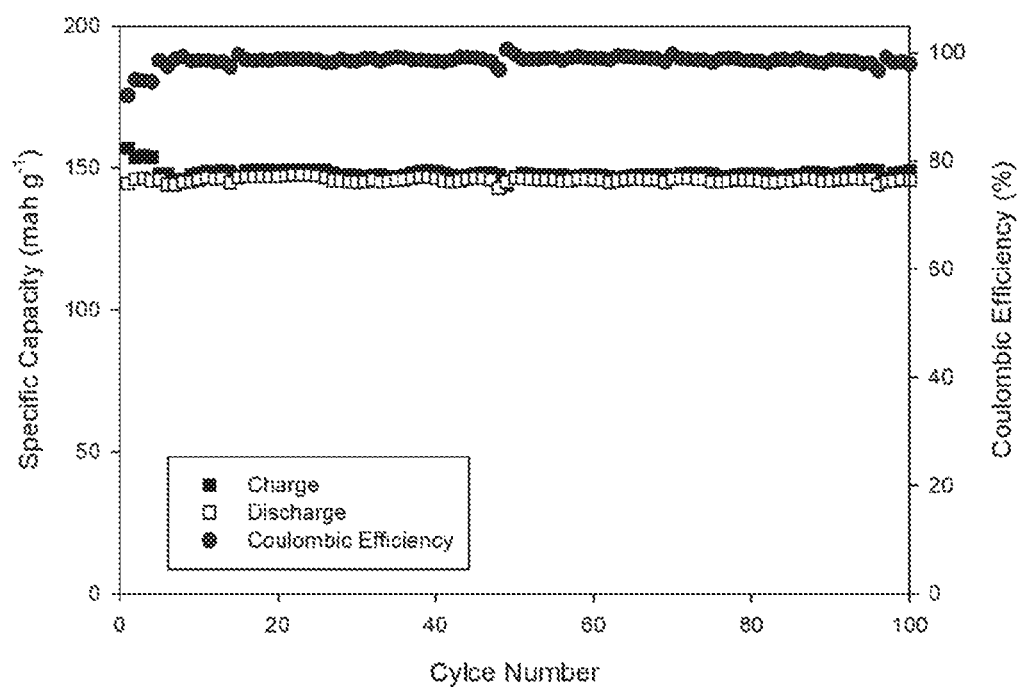
FIG. 22 is a graph of the test results of the energy storage device that uses PVDF, produced in comparative example 1, as a binder of the positive electrode.

The LiFePO$_4$ positive electrode plates produced in comparative example 1-1 are assembled in form of a button cell battery individually. Place the commercially available polypropylene (PP) membrane between the aforementioned LiFePO$_4$ positive electrode and the lithium metal negative electrode to assemble an energy storage device. Use an 8-channel, low electric current, automatic charge/discharge performance test system (AcuTech Systems, BAT-750B) to measure the efficiency of charge/discharge performance of the energy storage device. The electric potential setting ranges between 2.5~4.0V; the charge current setting is 0.1 C; the discharge current setting is set as 0.1 C, 0.5 C, 1 C, 3 C, 5 C, and 10 C. FIG. 21 and FIG. 22 are graphs of the test results of the energy storage device having the copolymer Pristine PVDF, produced in comparative example 1-1, as a binder of the positive electrode.

FIG. 21~FIG. 22 show graphs of the test results of the energy storage device that uses PVDF, produced in comparative example 1, as a binder of the positive electrode.

The discharge capacitance values, generated by the energy storage device in comparative example 1 at different current settings, are shown in Table 11.

TABLE 11

| | Discharge Rate (C-rate) | | | | | |
| --- | --- | --- | --- | --- | --- | --- |
| | C/10 | C/2 | 1 C | 3 C | 5 C | 10 C |
| Capacitance (mAh g$^{-1}$) | 133 | 130 | 127 | 117 | 102 | 64 |

Based on the test results shown in FIG. 21~FIG. 22 and Table 11, it is confirmed that the energy storage device of comparative example 1 using a binder, which is not grafted to a functional group with ionic conductive function, has relatively lower efficiency of charge/discharge performance compared to that of the energy storage device of the present invention.

Comparative Example 2: P-g-PAN

The copolymer P-g-PAN used in Comparative Example 2 is described in U.S. Pat. No. 8,993,157 B2, and its preparation method is as follows:

Two grams (2 g) of poly(vinylidene difluoride) (PVDF) is dissolved in 30 ml NMP solvent. After the substance is completely dissolved, inject an appropriate volume of ozone for 20 minutes. Afterward, add 4 g of acrylonitrile (AN) and let the reaction take place at 70° C. After the reaction is completed, slowly pour the polymer solution into methanol for precipitation; the precipitated material is then filtered using suction filtration. The final output is the P-g-PAN of comparative example 2.

Comparative Example 2-1

Take 0.1 g of P-g-PAN prepared in comparative example 2; then add 0.1 g of Super P (TIMCAL Ltd.) and 0.8 g of (LiFePO$_4$) individually and stir thoroughly. Paste the completely mixed slurry on an aluminum foil. Place the aluminum foil in a vacuum oven, heated to 100° C., for 120 hours. After the applied coatings are dried, retrieve the aluminum foil from the vacuum oven. In this way, LiFePO$_4$ positive electrode plates that comprise P-g-PAN copolymer, produced in comparative example 2, as the binder are produced.

Comparative Example 2-2

Figure 23:
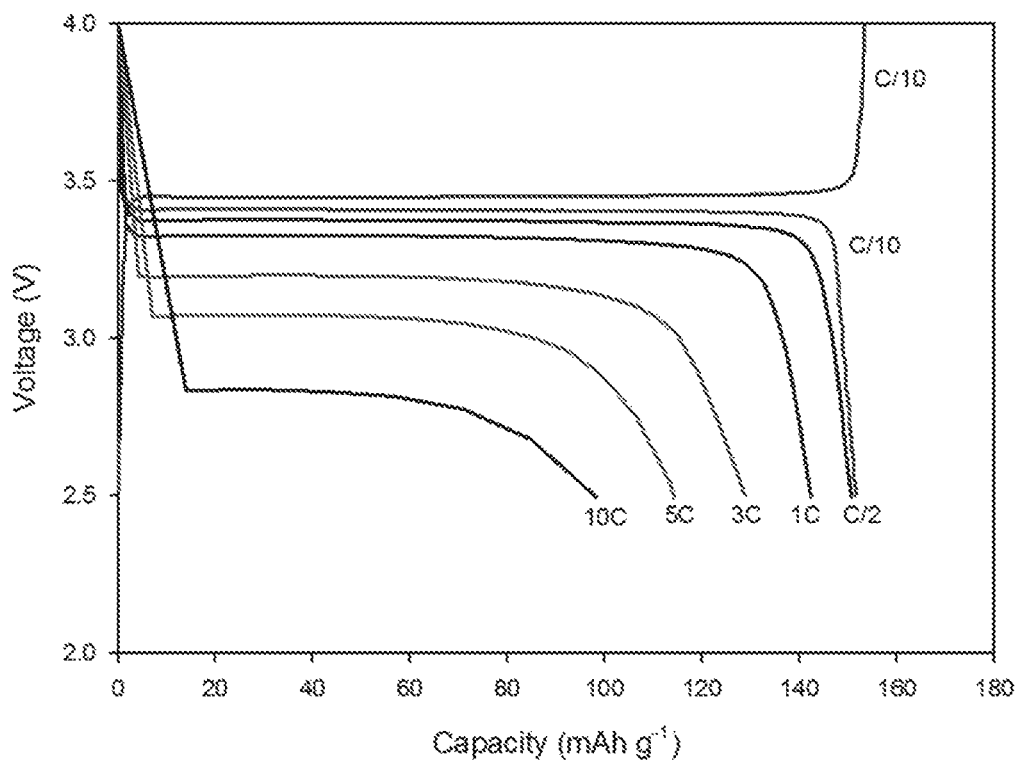
FIG. 23 is a graph of the test results of the energy storage device that uses P-g-PAN, produced in comparative example 2, as a binder of the positive electrode.
Figure 24:
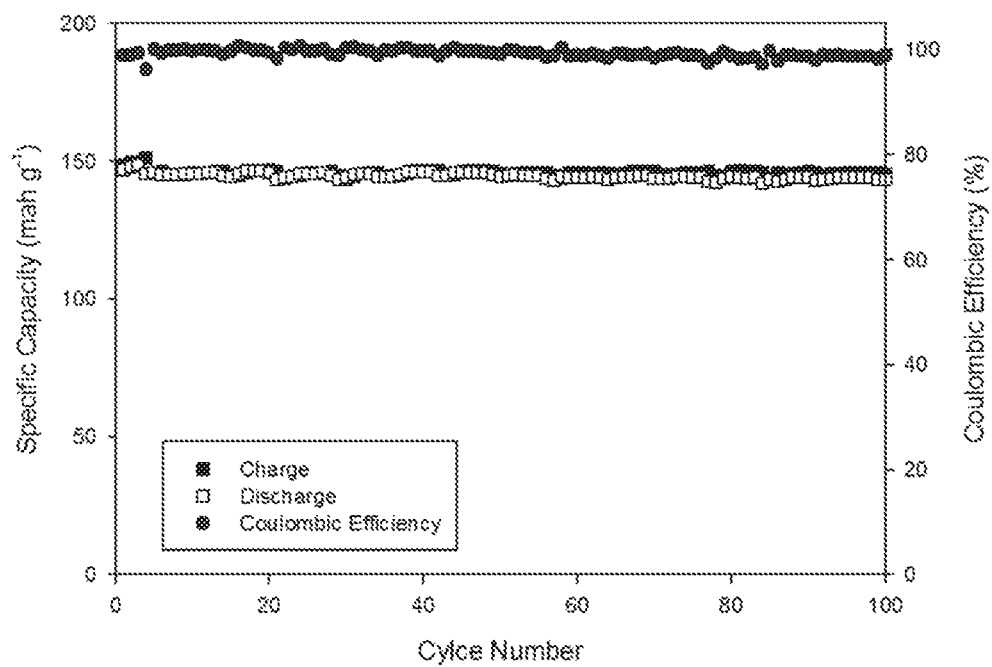
FIG. 24 is a graph of the test results of the energy storage device that uses P-g-PAN, produced in comparative example 2, as a binder of the positive electrode.

The LiFePO$_4$ positive electrode plates produced in comparative example 2-1 are assembled in form of a button cell battery individually. Place the commercially available polypropylene (PP) membrane between the aforementioned LiFePO$_4$ positive electrode and the lithium metal negative electrode to assemble an energy storage device. Use an 8-channel, low electric current, automatic charge/discharge performance test system (AcuTech Systems, BAT-750B) to measure the efficiency of charge/discharge performance of the energy storage device. The electric potential setting ranges between 2.5~4.0V; the charge current setting is 0.1 C; the discharge current setting is set as 0.1 C, 0.5 C, 1 C, 3 C, 5 C, and 10 C. FIG. 23 and FIG. 24 are graphs of the test results of the energy storage device having the copolymer P-g-PAN, produced in comparative example 2-1, as a binder of the positive electrode.

FIG. 23~FIG. 24 show graphs of the test results of the energy storage device that uses P-g-PAN, produced in comparative example 2, as a binder of the positive electrode.

The discharge capacitance values, generated by the energy storage device in comparative example 2 at different current settings, are shown in Table 12.

TABLE 12

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 156 | 152 | 148 | 126 | 111 | 72 |

Based on the test results shown in FIG. 23~FIG. 24 and Table 12, it is confirmed that the energy storage device of comparative example 2 using a binder, which is only grafted to polyacrylonitrile (PAN) but not a functional group with ionic conductive function, has relatively lower efficiency of charge/discharge performance compared to that of the energy storage device of the present invention.

Comparative Example 3: Pristine PVDF (Negative Electrode)

The Pristine PVDF of Comparative Example 1 is ungrafted polyvinylidene difluoride (purchased from Arkema).

Comparative Example 3-1

Take 0.1 g of Pristine PVDF in comparative example 3; then add 0.1 g of Super P (TIMCAL Ltd.) and 0.8 g of graphite individually and stir thoroughly. Paste the completely mixed slurry on a copper foil. Place the copper foil in a vacuum oven, heated to 100° C., for 120 hours. After the applied coatings are dried, retrieve the copper foil from the vacuum oven. In this way, graphite negative electrode plates that comprise Pristine PVDF copolymer, prepared in comparative example 3, as the binder are produced.

Comparative Example 3-2

Figure 25:
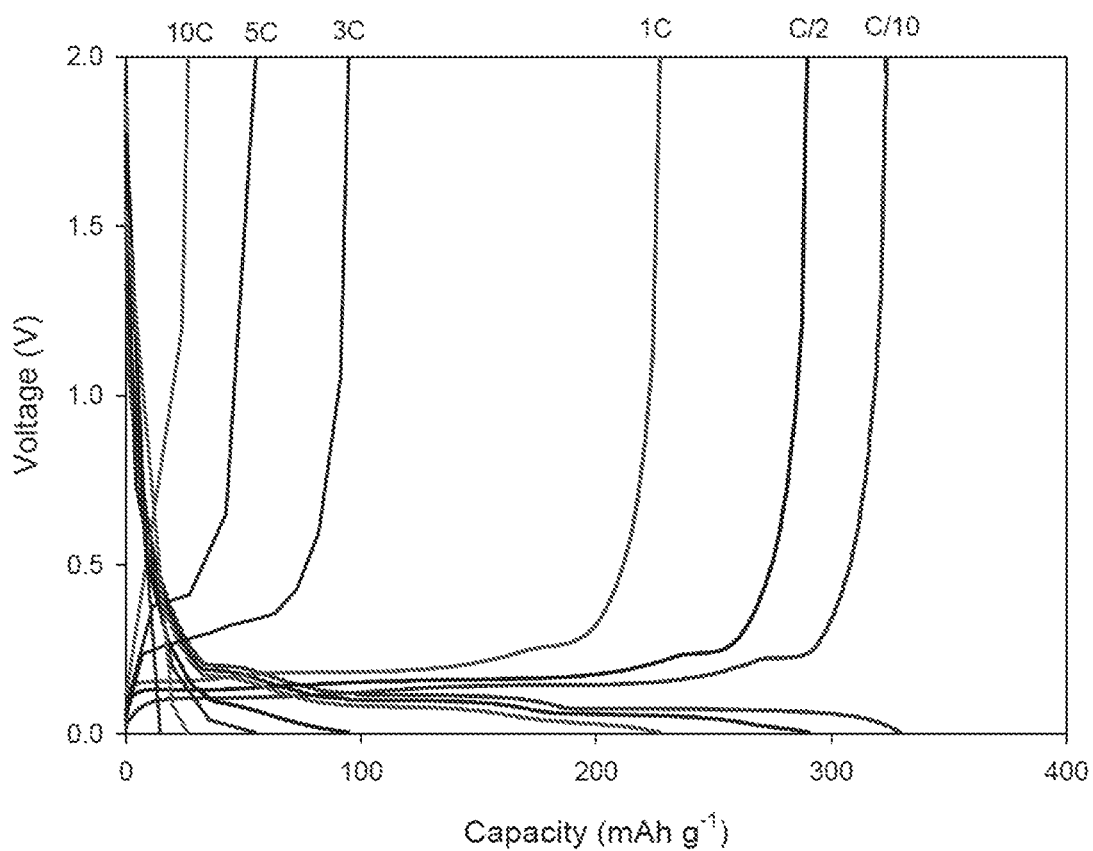
FIG. 25 is a graph of the test results of the energy storage device that uses PVDF, produced in comparative example 3, as a binder of the negative electrode.

The graphite negative electrode plates produced in comparative example 3-1 are assembled in form of a button cell battery individually. Place the commercially available polypropylene (PP) membrane between the aforementioned graphite negative electrode and the lithium metal negative electrode to assemble an energy storage device. Use an 8-channel, low electric current, automatic charge/discharge performance test system (AcuTech Systems, BAT-750B) to measure the efficiency of charge/discharge performance of the energy storage device. The electric potential setting ranges between 2.5~4.0V; the charge current setting is 0.1 C; the discharge current setting is set as 0.1 C, 0.5 C, 1 C, 3 C, 5 C, and 10 C. FIG. 25 show the graph of the test results of the energy storage device having the copolymer Pristine PVDF, produced in comparative example 3-1, as a binder of the negative electrode.

FIG. 25 shows the graph of the test results of the energy storage device that uses PVDF, produced in comparative example 3, as a binder of the negative electrode.

The discharge capacitance values, generated by the energy storage device in comparative example 3 at different current settings, are shown in Table 13.

TABLE 13

| | Discharge Rate (C-rate) | | | | | |
|---|---|---|---|---|---|---|
| | C/10 | C/2 | 1 C | 3 C | 5 C | 10 C |
| Capacitance (mAh g$^{-1}$) | 323 | 290 | 227 | 95 | 55 | 26 |

Based on the test results shown in FIG. 25 and Table 13, it is confirmed that the energy storage device of comparative example 3 using a binder, which is not grafted to a functional group with ionic conductive function, has relatively lower efficiency of charge/discharge performance compared to that of the energy storage device of the present invention.

In summary of the test results of aforementioned embodiments and comparative examples, the energy storage device of the present invention has at least one of the anode, the cathode and the electrolyte membrane thereof to be incorporated with a copolymer wherein the copolymer is grafted to a functional group with ionic conductive function. Therefore, the energy storage device, which utilizes the aforementioned copolymer, has better efficiency of charge/discharge performance; thus the efficiency thereof increases; the lifetime thereof is prolonged effectively.

Furthermore, as described in embodiment 4, when the copolymer, already grafted to a functional group with ionic conductive function, is further grafted to a polyacrylonitrile (PAN), the efficiency of the energy storage device can be further improved and, at the same time, the binding capacity of the copolymer increases.

The above preferred embodiments are presented to disclose the novel features, contents, and advantages of the present invention. Those skilled in the art shall understand that the aforementioned descriptions are for illustration only and shall not be interpreted to limit the scope, applicability or configuration, of the present invention in any way. Any alternative embodiments that are modified or changed without departing from the spirit and scope of the present invention shall be included in the appended claims.

What is claimed is:

1. An energy storage device, comprising:
   an anode and a cathode; and
   an electrolyte membrane, installed in between the anode and the cathode,
   wherein at least one of the anode, the cathode and the electrolyte membrane comprising a copolymer which is derived from polyvinylidene difluoride (PVDF), and the copolymer is grafted with a functional group with the ionic conductive function,
   wherein the functional group with the ionic conductive function has a chemical structure selected from the group consisting of quaternary ammonium , phosphonium group, sulfonato, and polyether.

2. The energy storage device as claimed in claim 1, wherein at least one of the anode, the cathode and the electrolyte membrane is incorporated with the copolymer having the structural formula described in formula (I) or formula (II);

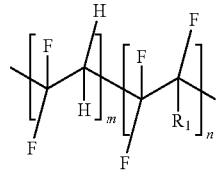

Formula (I)

Formula (II)

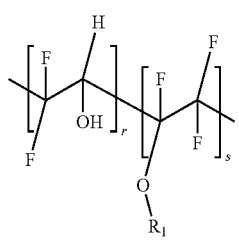

wherein $R_1$ is one of the following structures:

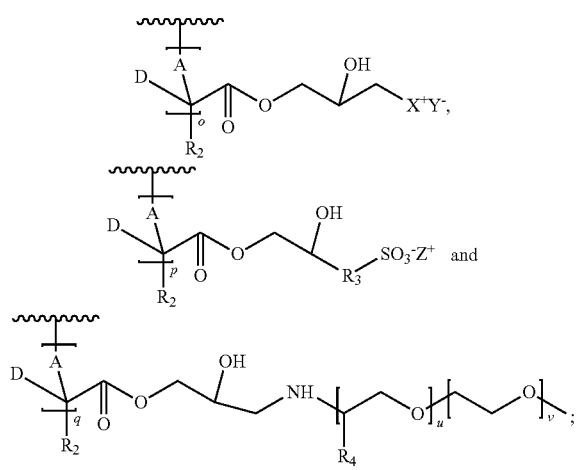

A is a covalent bond or —CH$_2$—;
D is H or —CH$_3$;
X$^+$ is chosen from

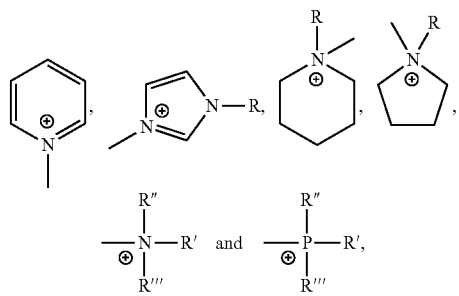

wherein R, R', R", R''' are independently chosen from —CH$_3$, —CH$_2$CH$_3$, —CH$_2$CH$_2$CH$_3$, —CH$_2$CH$_2$CH$_2$CH$_3$, —CH$_2$CH$_2$OCH$_3$ and —CH$_2$CH$_2$O—CH$_2$CH$_2$OCH$_3$CH$_3$;

Y$^-$ is chosen from PF$_6^-$, BF$_4^-$,

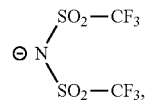

ClO$_4^-$, halide anion, and anions of lithium salt frequently used in the electrolyte;
Z$^+$ is Li$^+$ or H$^+$;
R$_2$ is chosen from H, halogen and

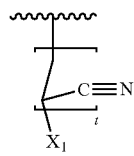

wherein $X_1$ is chosen from H, halogen and a termination group of polymerization;
R$_3$ is chosen from —CH$_2$— and —CH$_2$NHCH$_2$CH$_2$—;
R$_4$ is chosen from —CH$_3$, —CH$_2$CH$_3$ and H;
m/(m+n) ranges from 0.01 to 0.99; n/(m+n) ranges from 0.01 to 0.99; o ranges from 1 to 1000; p ranges from 1 to 1000; q ranges from 1 to 1000; r/(r+s) ranges from 0.1 to 0.9; s/(r+s) ranges from 0.1 to 0.9; t ranges from 1 to 1000; u ranges from 1 to 100; v ranges from 1 to 100.

3. The energy storage device as claimed in claim 2, wherein the energy storage device has an anode, comprising the copolymer that has the structure described in formula (I) or formula (II) to act as a binder.

4. The energy storage device as claimed in claim 3, wherein the copolymer content accounts for 0.1-30% of the anode composition by weight.

5. The energy storage device as claimed in claim 2, wherein the energy storage device has a cathode, comprising the copolymer that has the structure described in formula (I) or formula (II) to act as a binder.

6. The energy storage device as claimed in claim 5, wherein the copolymer content accounts for 0.1-30% of the cathode composition by weight.

7. The energy storage device as claimed in claim 2, wherein the energy storage device has an electrolyte membrane, comprising the copolymer that has the structure described in formula (I) or formula (II).

8. The energy storage device as claimed in claim 7, wherein the copolymer content accounts for 1-90% of the electrolyte membrane composition by weight.

9. The energy storage device as claimed in claim 7, wherein the electrolyte membrane is in gel form or in solid form.

* * * * *